United States Patent
Butterfield

(10) Patent No.: US 9,738,201 B2
(45) Date of Patent: Aug. 22, 2017

(54) MOVING HEADBOARD TRAILER EJECTOR AND FLOOR CLEANING APPARATUS

(71) Applicant: Larry D. Butterfield, Bellevue, NE (US)

(72) Inventor: Larry D. Butterfield, Bellevue, NE (US)

( * ) Notice: Subject to any disclaimer, the term of this patent is extended or adjusted under 35 U.S.C. 154(b) by 164 days.

(21) Appl. No.: 14/848,023

(22) Filed: Sep. 8, 2015

(65) Prior Publication Data
US 2015/0375661 A1    Dec. 31, 2015

Related U.S. Application Data

(63) Continuation-in-part of application No. 13/465,650, filed on May 7, 2012, now Pat. No. 9,126,520, which is a continuation-in-part of application No. 12/184,470, filed on Aug. 1, 2008, now abandoned.

(51) Int. Cl.
| | | |
|---|---|---|
| *B60P 1/00* | (2006.01) | |
| *B65G 25/06* | (2006.01) | |
| *B65D 88/60* | (2006.01) | |

(52) U.S. Cl.
CPC .............. *B60P 1/006* (2013.01); *B65D 88/60* (2013.01); *B65G 25/065* (2013.01)

(58) Field of Classification Search
CPC ........ B60P 1/006; B60P 1/365; B65G 25/065; B65D 88/60
See application file for complete search history.

(56) References Cited

U.S. PATENT DOCUMENTS

| | | |
|---|---|---|
| 3,578,186 A | 5/1971 | Thomas |
| 3,953,170 A | 4/1976 | Webb |
| 3,998,343 A | 12/1976 | Fors |
| 4,015,727 A | 4/1977 | Rezac |
| 4,162,735 A | 7/1979 | Lewis |
| 4,632,628 A | 12/1986 | Kress et al. |
| 4,927,316 A | 5/1990 | Kordel |
| 5,096,356 A | 3/1992 | Foster |
| 5,170,968 A | 12/1992 | Helmner |
| 5,314,290 A | 5/1994 | Lutz et al. |
| 5,445,260 A | 8/1995 | Foster |
| 5,901,874 A | 5/1999 | Deters |
| 6,085,948 A | 7/2000 | Putze |
| 6,357,578 B1 | 3/2002 | Shelby |
| 6,837,668 B1 | 1/2005 | Brown |
| 7,147,423 B2 | 12/2006 | Golden et al. |
| 7,510,071 B2 | 3/2009 | Foster |

(Continued)

*Primary Examiner* — Glenn Myers
(74) *Attorney, Agent, or Firm* — Law Office of Mark Brown, LLC; Christopher M. DeBacker; Mark E. Brown

(57) ABSTRACT

The present invention relates to a detachably attachable moving headboard trailer ejector and floor cleaning apparatus for use with a self-unloading trailer having a front end, a rear end, side walls, and either a reciprocating slat conveyor floor or a conveyor belt floor. The invention comprises, in one embodiment, a base, a panel sweeper, one or more panel sweeper support members, a means for traversing the panel sweeper, a tether bar, side flanges, and a base flange. In use, the invention is placed in the front end of a self-unloading trailer and the trailer is loaded with material; when material is ejected from the trailer, the invention transverses or "travels" along the top of the moving floor and pushes the material out of the trailer's back end. The rubber flanges ensure a snug fit within the trailer and keep post ejection residual material at a minimum.

12 Claims, 23 Drawing Sheets

(56) References Cited

U.S. PATENT DOCUMENTS

| | | |
|---|---|---|
| 8,100,625 B2 | 1/2012 | Lutz |
| 2008/0253857 A1 | 10/2008 | McJunkin |
| 2010/0028114 A1 | 2/2010 | Butterfield |

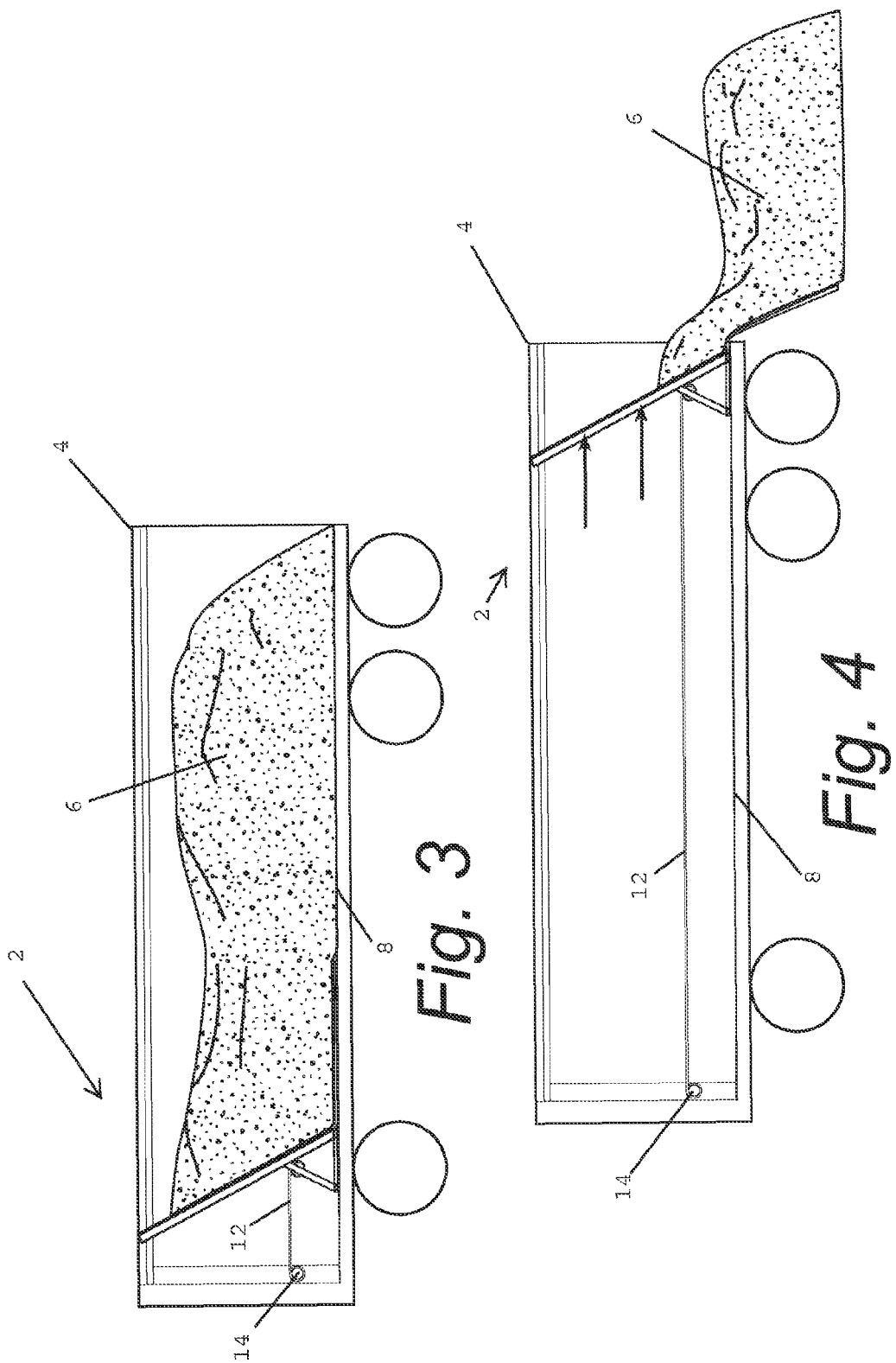

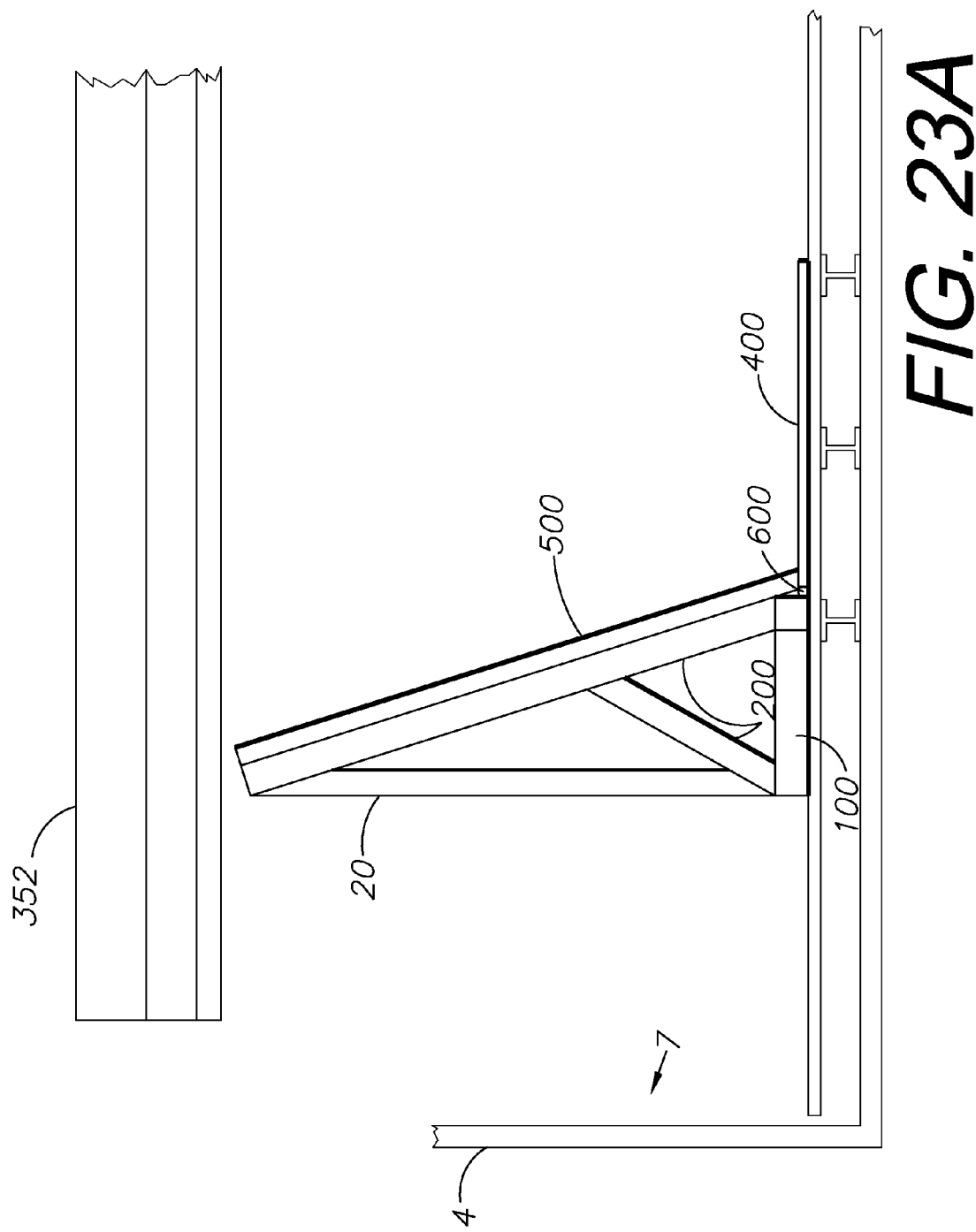

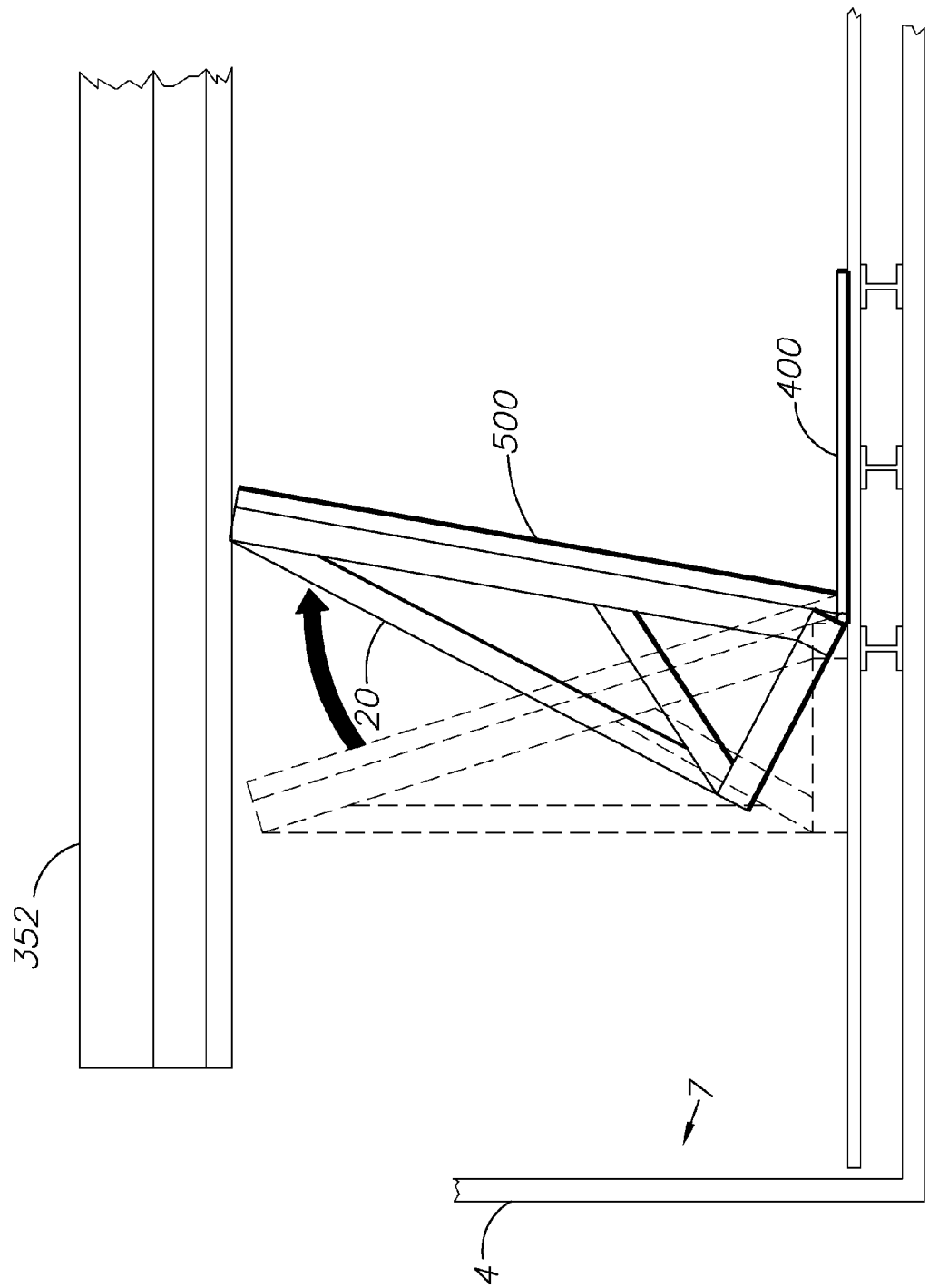

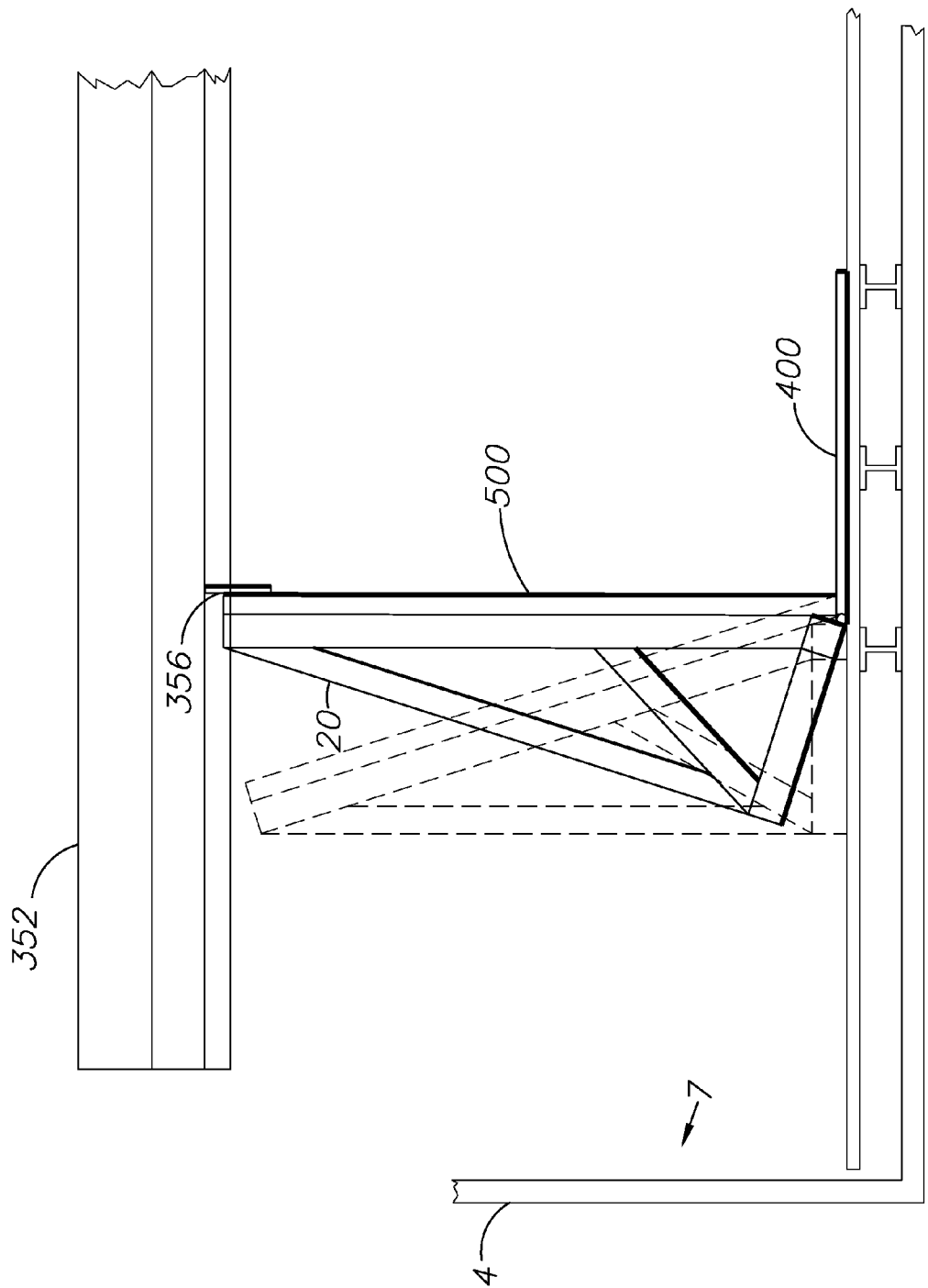

MOVING HEADBOARD TRAILER EJECTOR AND FLOOR CLEANING APPARATUS

CROSS-REFERENCE TO RELATED APPLICATIONS

This application is a continuation-in-part of U.S. patent application Ser. No. 13/465,650, filed May 7, 2012, now U.S. Pat. No. 9,126,520, issued Sep. 8, 2015, which is a continuation-in-part of and claims the benefit of U.S. patent application Ser. No. 12/184,470, filed Aug. 1, 2008, now abandoned, both of which are incorporated herein by reference.

BACKGROUND OF THE INVENTION

1. Field of the Invention

The present invention relates generally to devices for ejecting bulk materials from trailers. More particularly, the present invention relates to a detachably attachable moving headboard trailer ejector and floor cleaning apparatus for use with a self-unloading trailer having a front end, a rear end, side walls, and either a reciprocating slat conveyor floor or a conveyor belt floor.

2. Description of the Related Art

Many bulk commodities and aggregates are transported throughout the United States by various types of trailers, including transport semi-trailers. Materials commonly moved include, but are not limited to, dirt, sand, rock, grain, etc. A truck operator is paid to move material from one location to another—the more material an operator can move in a given period of time, the more profitable the operator's business will be.

Many transport trailers used by operators are of the "self-unloading" type. Self-unloading trailers use one of several forms of "moving floors" to eject material from the trailer. Moving floors come in various forms including, but not limited to, reciprocating slat floors and conveyor belt floors. By their automation, these floors substantially decrease the time required to eject material from trailers compared to manual ejection methods. One time consuming drawback of a moving floor, however, is that after ejecting transported material from the trailer, some amount of residual transported material often remains on the trailer floor—material that must be manually swept or shoveled out of the trailer. Removing residual material from a trailer takes time, which increases the total transport time and reduces the operator's profit.

Heretofore there has not been available a moving headboard trailer ejector system or apparatus with the advantages and features of the present invention.

SUMMARY OF THE INVENTION

The present invention relates to a detachably attachable moving headboard trailer ejector and floor cleaning apparatus for use with a self-unloading trailer having a front end, a rear end, side walls, and either a reciprocating slat conveyor floor or a conveyor belt floor. The invention comprises, in one embodiment, a base, a panel sweeper, one or more panel sweeper support members, a means for traversing the panel sweeper, a tether bar, side flanges, and a base flange.

In use, the invention is placed in the front end of a self-unloading trailer and the trailer is loaded with material; when the moving floor is activated and material is ejected from the trailer, the invention "travels" or transverses along the moving floor and pushes the material out of the trailer's back end. The rubber flanges ensure a snug fit within the trailer and keep post ejection residual material at a minimum. After ejection is complete, the apparatus may be pushed back into place or pulled back into place via the tether bar. The invention may be used with most self-unloading trailers and does not require retrofitting of trailers for proper use. The means for traversing the panel sweeper may include a stationary door, a hinged door, a horizontally sliding panel, or a vertically sliding panel and gives the operator access to the trailer area behind the apparatus without the need to climb over the apparatus and risk injury.

BRIEF DESCRIPTION OF THE DRAWINGS

The drawings constitute a part of this specification and include exemplary embodiments of the present invention illustrating various objects and features thereof.

FIG. 3 illustrates a side view of one embodiment of the invention in use loaded with particulate material.

FIG. 4 illustrates a side view of an embodiment of the invention including unloaded particulate material.

FIG. 23A is a side elevational view of the prior art thereof.

FIG. 23B is a side elevational view thereof, showing elements of the prior art in a tipping state.

FIG. 23C is the alternative embodiment thereof, showing elements of present invention in a tipping state.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

The present invention features an ejector system 2 which mounts within an existing trailer 4 and is used to unload material from within that trailer. The present invention may be included in new trailers as a complete ejector trailer system, or it may be retrofitted into existing trailers implementing a "moving floor" or reciprocating slat floor system.

II. Preferred Embodiment or Aspect Ejector Trailer System 2

The embodiments discussed herein are merely illustrative of specific manners in which to make and use the invention and are not to be interpreted as limiting the scope of the instant invention.

Figure 1:
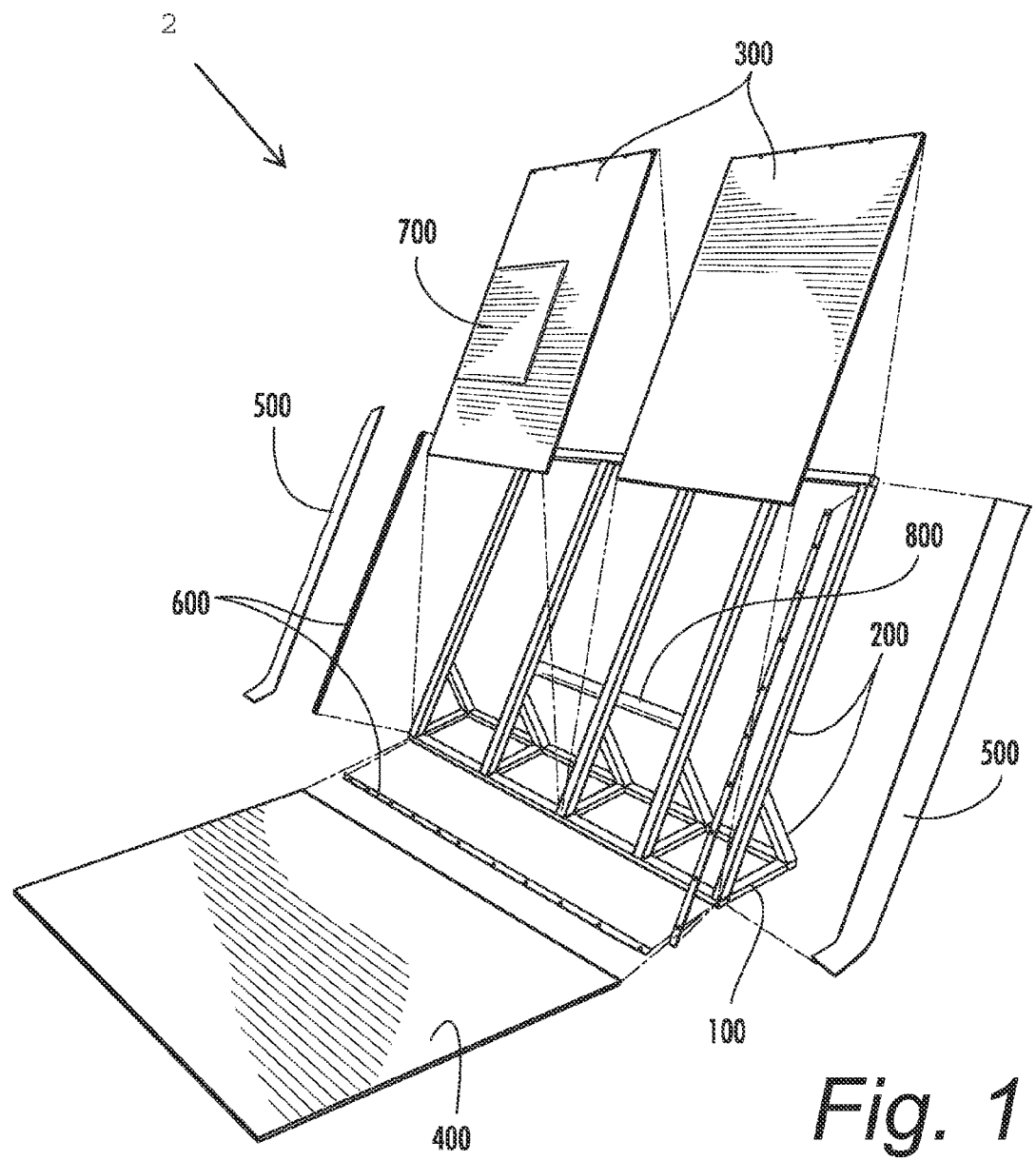
FIG. 1 illustrated an exploded perspective view of one embodiment of the invention.

Referring to the drawings in detail, FIG. 1 illustrates an exploded perspective view of one embodiment of the invention. A rectangular base member 100 with support members 200 mounted thereon supports the panel sweeper 300. In the preferred embodiment, the base and support members are made of aluminum; the base and support members may, however, be formed of any other appropriate material capable of achieving the desired form and performing the desired function including, but not limited to, plastic, metal, or wood. In the preferred embodiment the panel sweeper is sheet metal; the panel sweeper may, however, be formed of any other appropriate material capable of achieving the desired form and performing the desired function including, but not limited to, plastic, metal, or wood.

A base flange 400 and two side flanges 500 are mounted onto the panel sweeper at the bottom and sides of the panel sweeper respectively. The surface of the base flange 400 may be of any area up to and including the same area of the panel sweeper 300 face. In the preferred embodiment, the flanges are made of rubber; the flanges may, however, be formed of any other appropriate material capable of achieving the desired form and performing the desired function. This allows the ejector system 2 to handle material 6 of a high moisture content, as shown in FIGS. 3 and 4, such as wood pulp, corn, mulch, grain, or similar products which otherwise would tend to stick to the floor and walls 5 of the trailer 4.

In the present embodiment, the flanges are mounted onto the panel sweeper via a plate and screw assembly 600; the flanges may also be mounted by any other appropriate means including, but not limited to a plate and rivet assembly, adhesives, or mounting the flanges between the panel sweeper and support members. A means for traversing the panel sweeper may include an access door 700, such as a hinged door, a horizontally sliding panel, or a vertically sliding panel and provides access to the trailer area behind the apparatus without the need to climb over the apparatus and risk injury. A tether bar 800 is mounted between the support members. In an alternate embodiment, the tether bar may be mounted on the back portion of the panel sweeper itself. In the preferred embodiment, the tether bar is made of aluminum; the tether bar may, however, be formed of any other appropriate material capable of achieving the desired form and performing the desired function including, but not limited to, plastic, metal, or wood.

Figure 2:
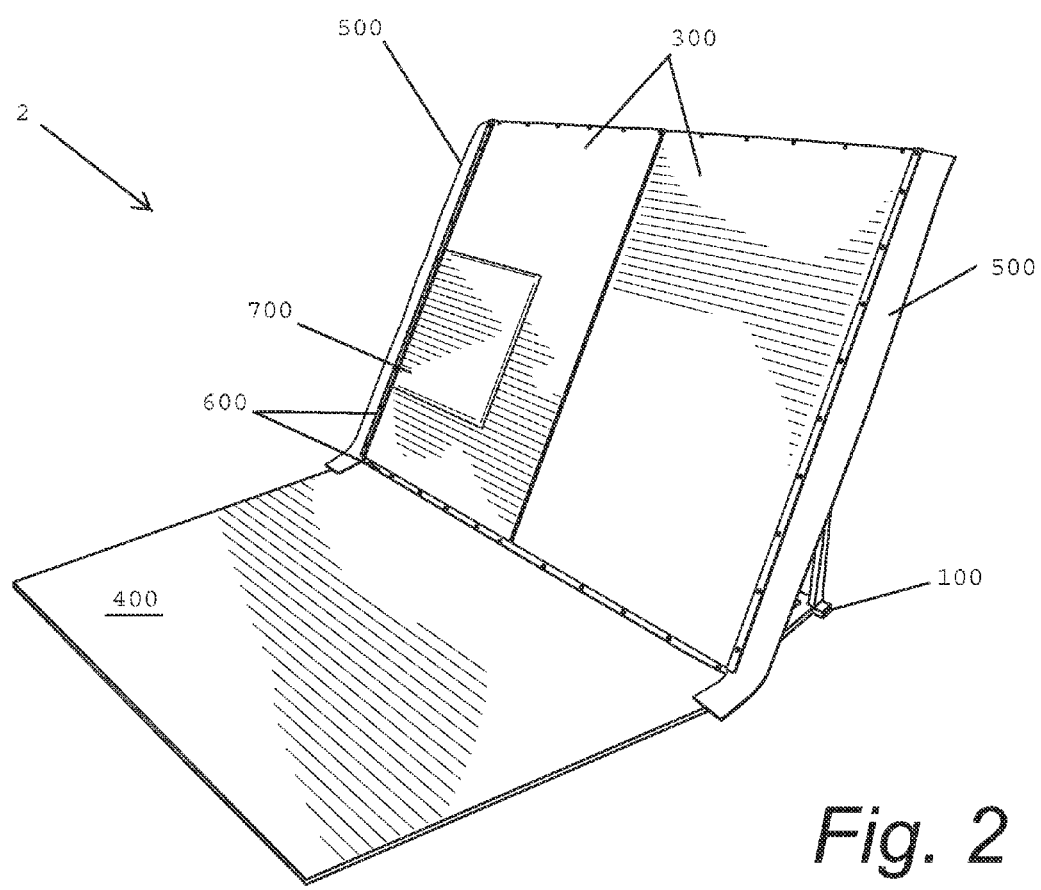
FIG. 2 illustrates a perspective view of one embodiment of the invention.

FIG. 2 illustrates a perspective view of one embodiment of the invention in its assembled state.

FIG. 3 illustrates the invention in the bed of a self-unloading trailer 4 that has been filled with material 6 in a position ready to be unloaded. The trailer employs a moving floor system 8 comprised of a number of moving floor slats 10, such as that provided by the Keith® Walking Floor® system of Keith Mfg., Co. of Oregon, USA. This moving floor system 8 causes the entire load 6 and the ejector system 2 to move toward the open end of the trailer 4, thereby causing the load 6 to be ejected from the trailer. The ejector system 2 ensures that the entire load 6 is ejected, even if that load is comprised of high-moisture content material.

Figure 5:
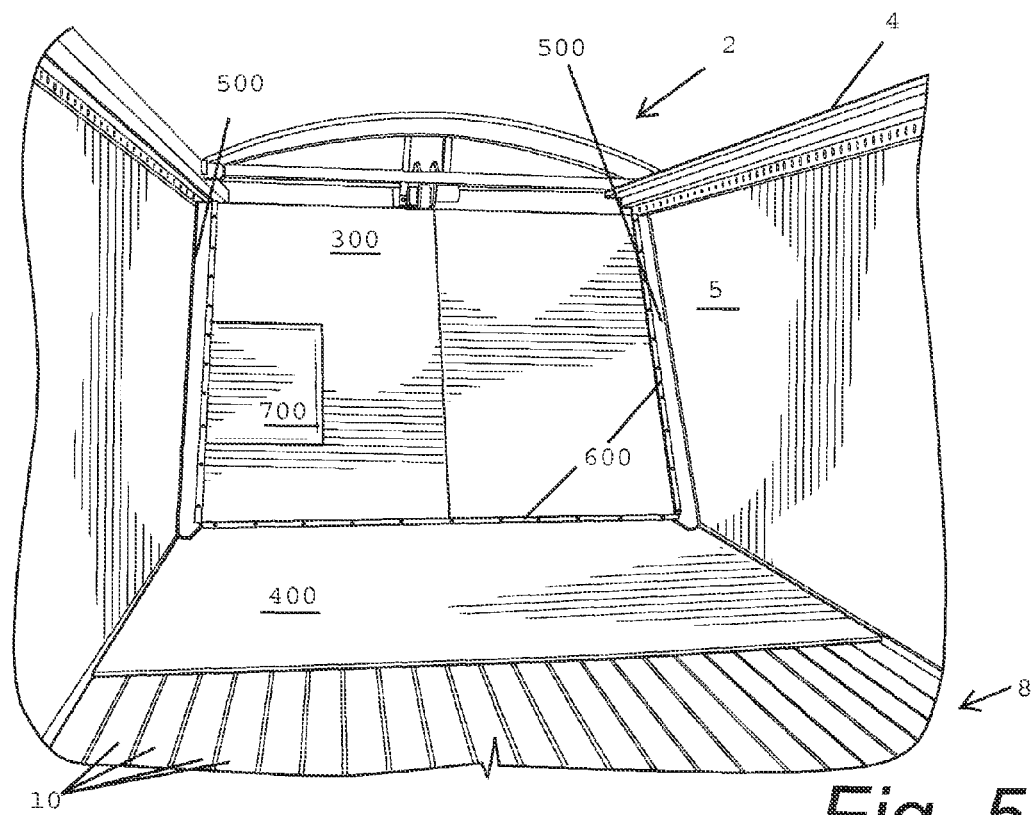
FIG. 5 illustrates a front perspective view of an embodiment of the invention in a trailer including a reciprocating slat conveyor.
Figure 6:
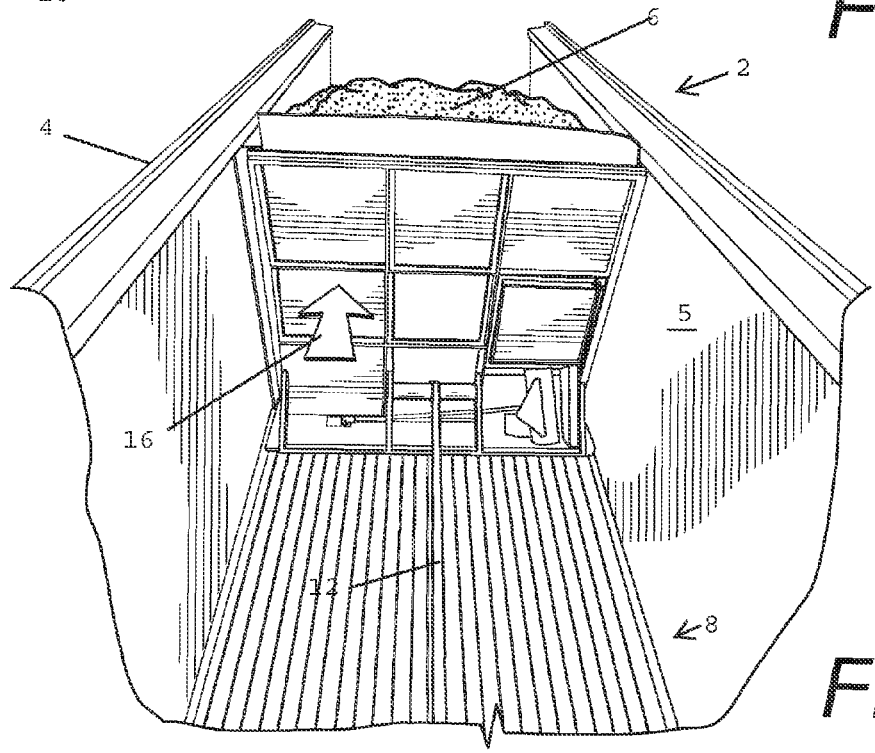
FIG. 6 illustrates a rear view of an embodiment of the invention in a trailer including a reciprocating slat conveyor.
Figure 7:
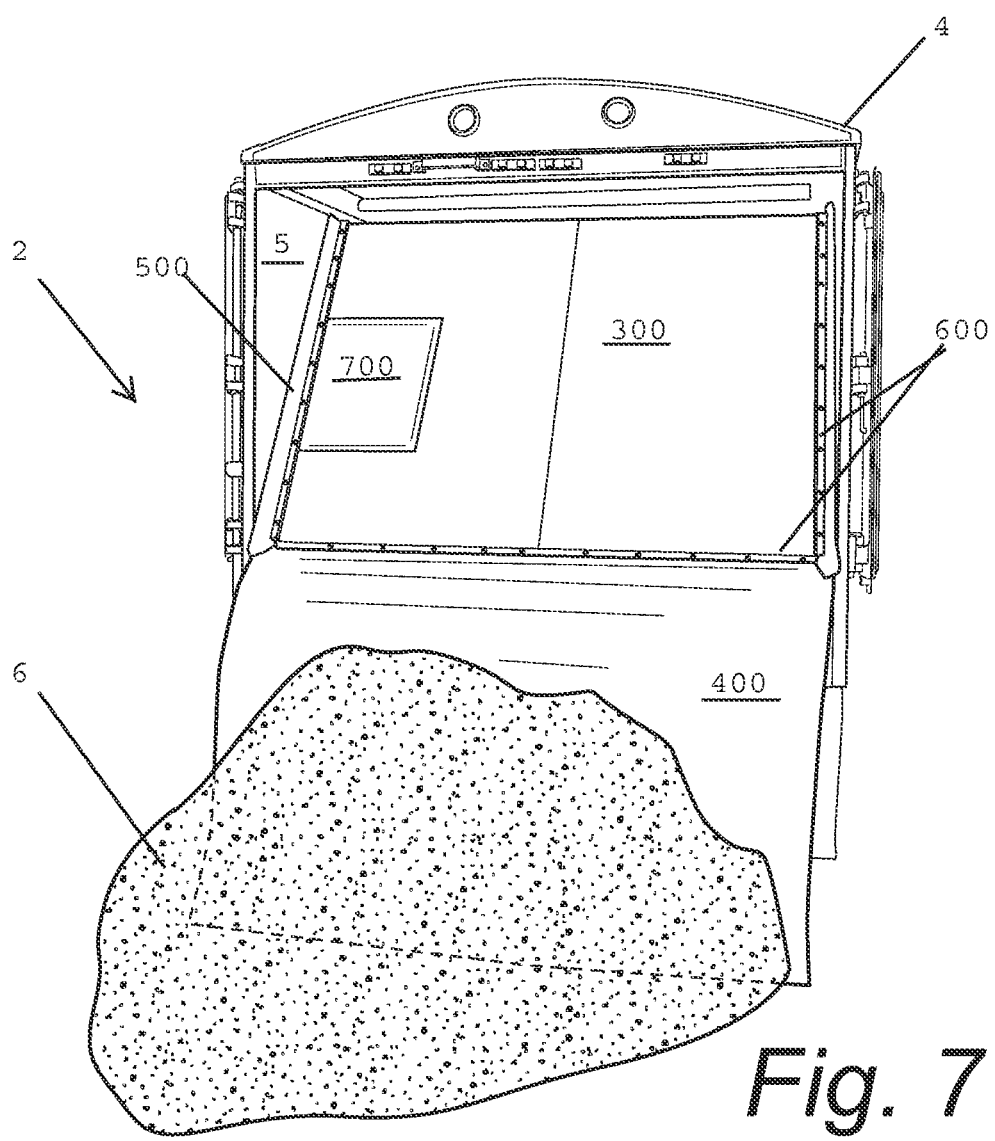
FIG. 7 illustrates a rear perspective view of a trailer including a reciprocating slat conveyor and an embodiment of the invention having unloaded particulate material.
Figure 8:
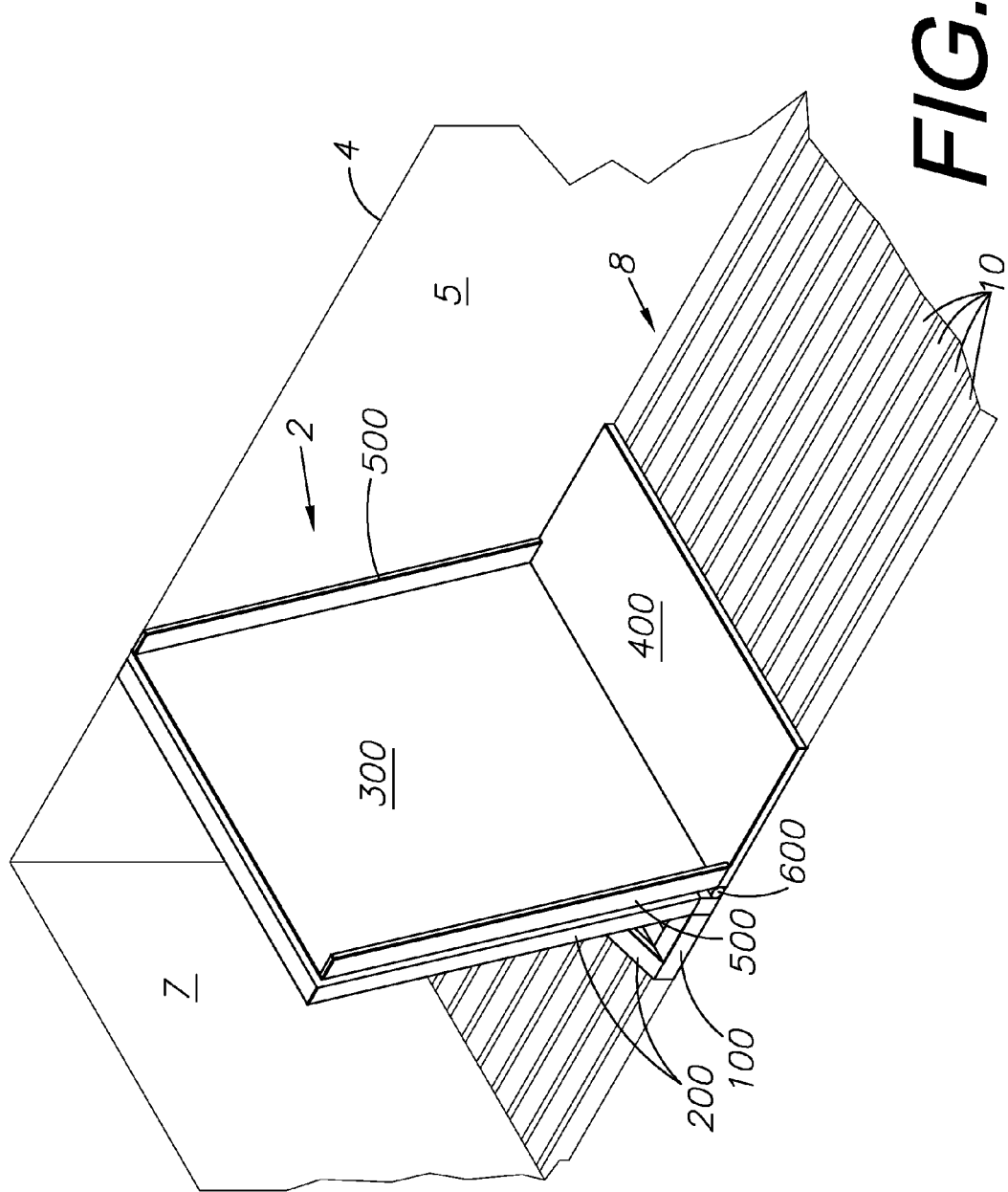
FIG. 8 is a perspective view illustrating an embodiment of the present invention placed on top of a reciprocating slat conveyor.

FIG. 4 illustrates the invention in the bed of a self-unloading trailer and in the process of ejecting material therefrom. FIGS. 5-7 illustrate additional views of the invention in the bed of a self-unloading trailer and in use. The ejector system 2 is moved along the internal space of the trailer 4 by the moving floor system 8 in the direction of the arrow 16.

FIGS. 8 through 12 demonstrate a method of using the ejector system 2 mounted within a trailer fitted with a reciprocating slat conveyor system 8. The conveyor system 8 is comprised of a number of reciprocating slats 10, capable of moving both the ejector system 2 and the material 6 loaded in the trailer 4. The reciprocating floor system 8 physically moves the ejector system 2 toward the open end of the trailer 4, thereby pushing the loaded material 6 out of the trailer.

Figure 9:
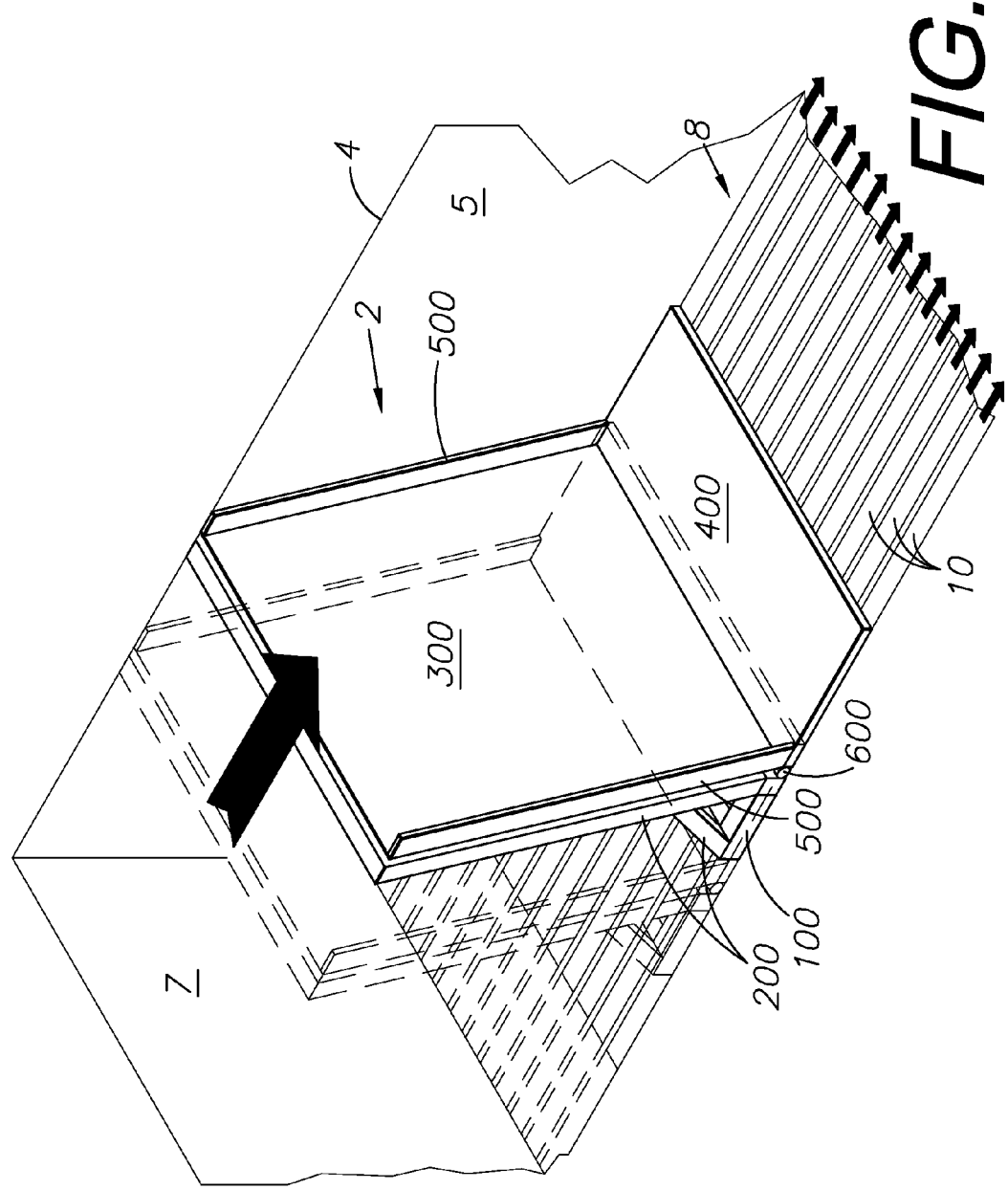
FIG. 9 is a perspective view illustrating an embodiment of the present invention placed on top of a reciprocating slat conveyor beginning an unload cycle.

FIG. 9 shows the beginning of an unloading process, whereby the various reciprocating slats 10 are moved toward the open end of the trailer, thereby advancing the ejector system 2 and any material 6 loaded within the trailer 4.

Figure 10:
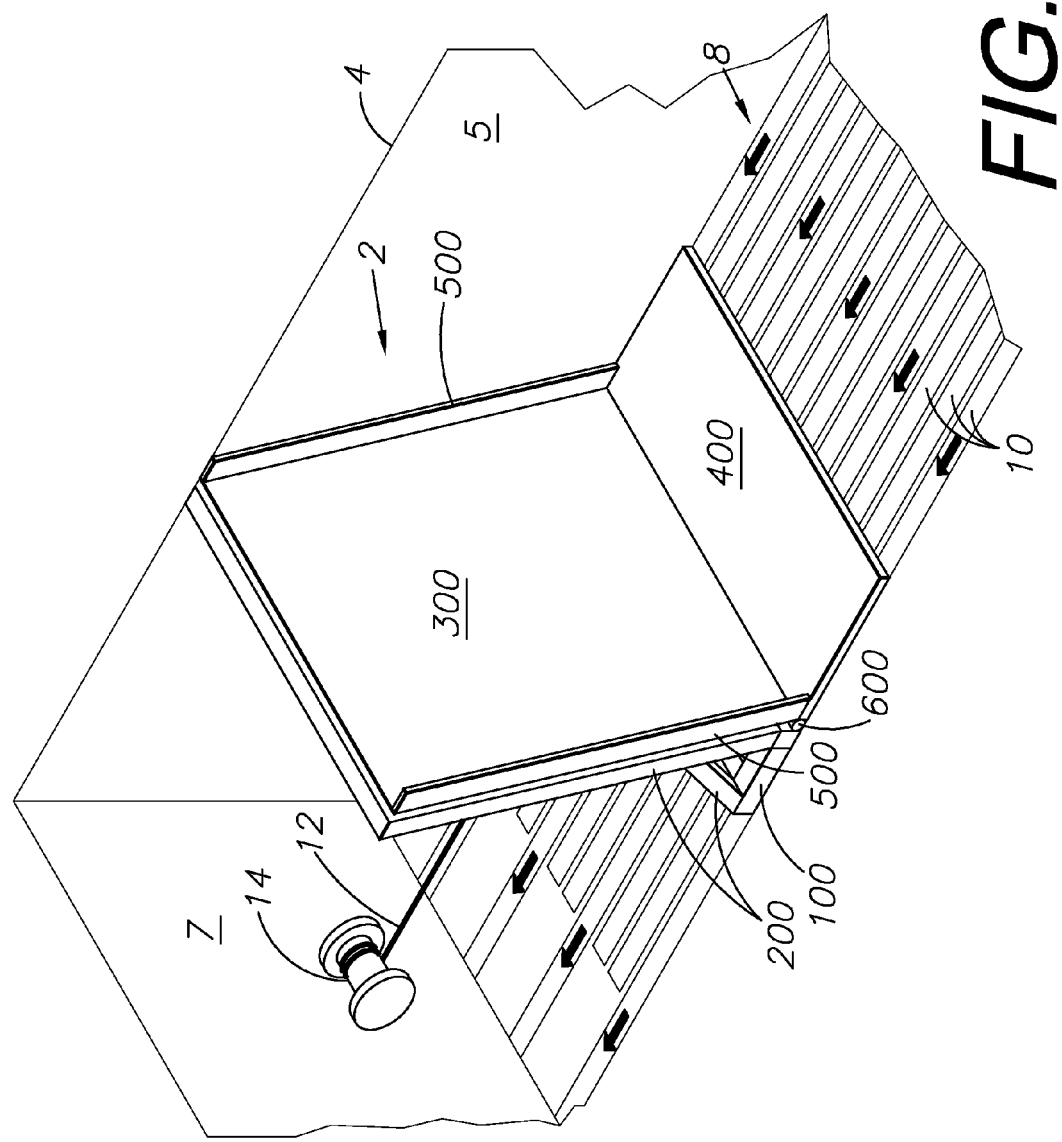
FIG. 10 illustrates an embodiment of the present invention placed on top of a reciprocating slat conveyor at the end of an unload cycle, wherein a first group of reciprocating slats is retracted.
Figure 11:
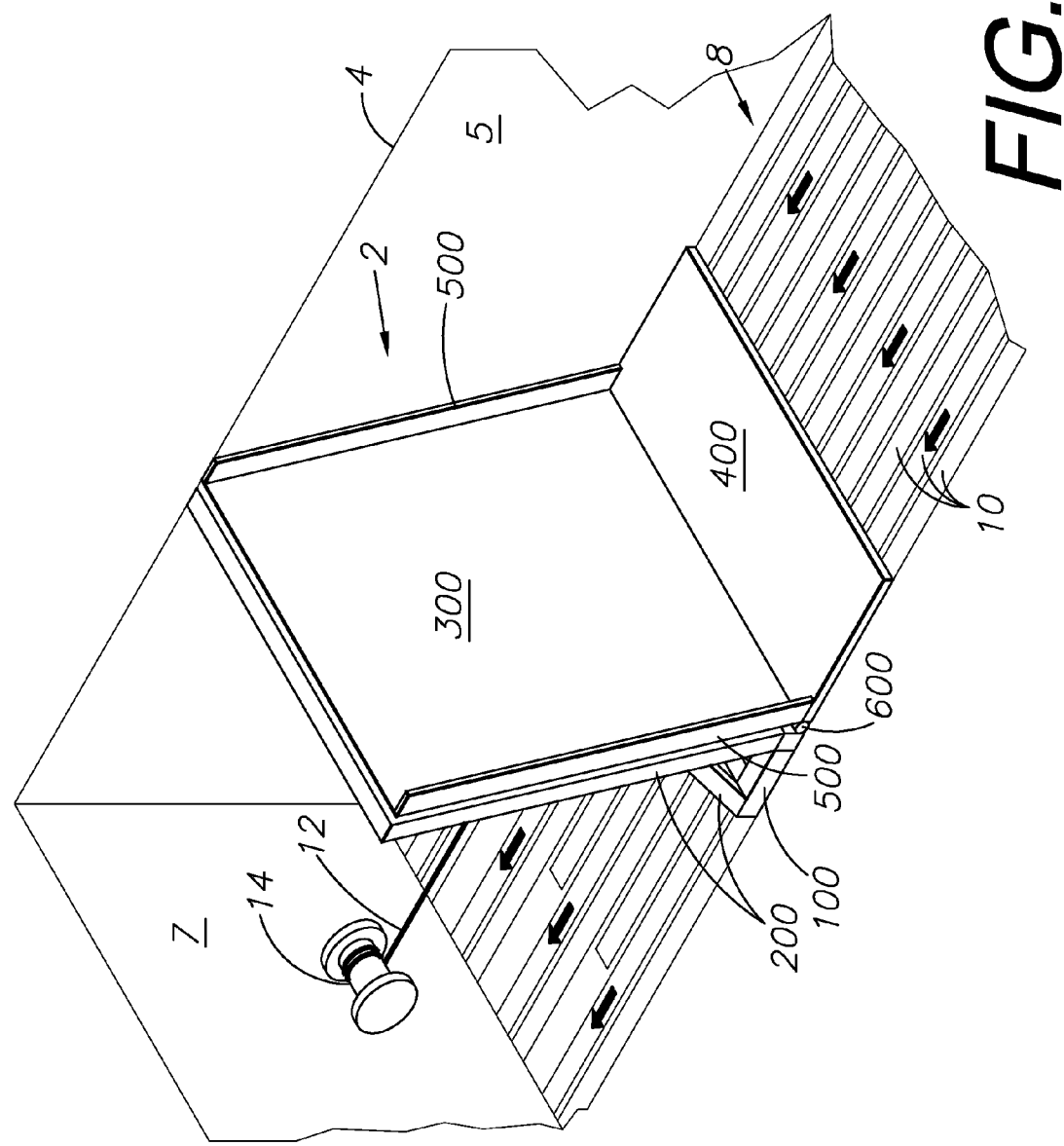
FIG. 11 is a perspective view illustrating an embodiment of the present invention placed on top of a reciprocating slat conveyor at the end of an unload cycle, wherein a second group of reciprocating slats is retracted.
Figure 12:
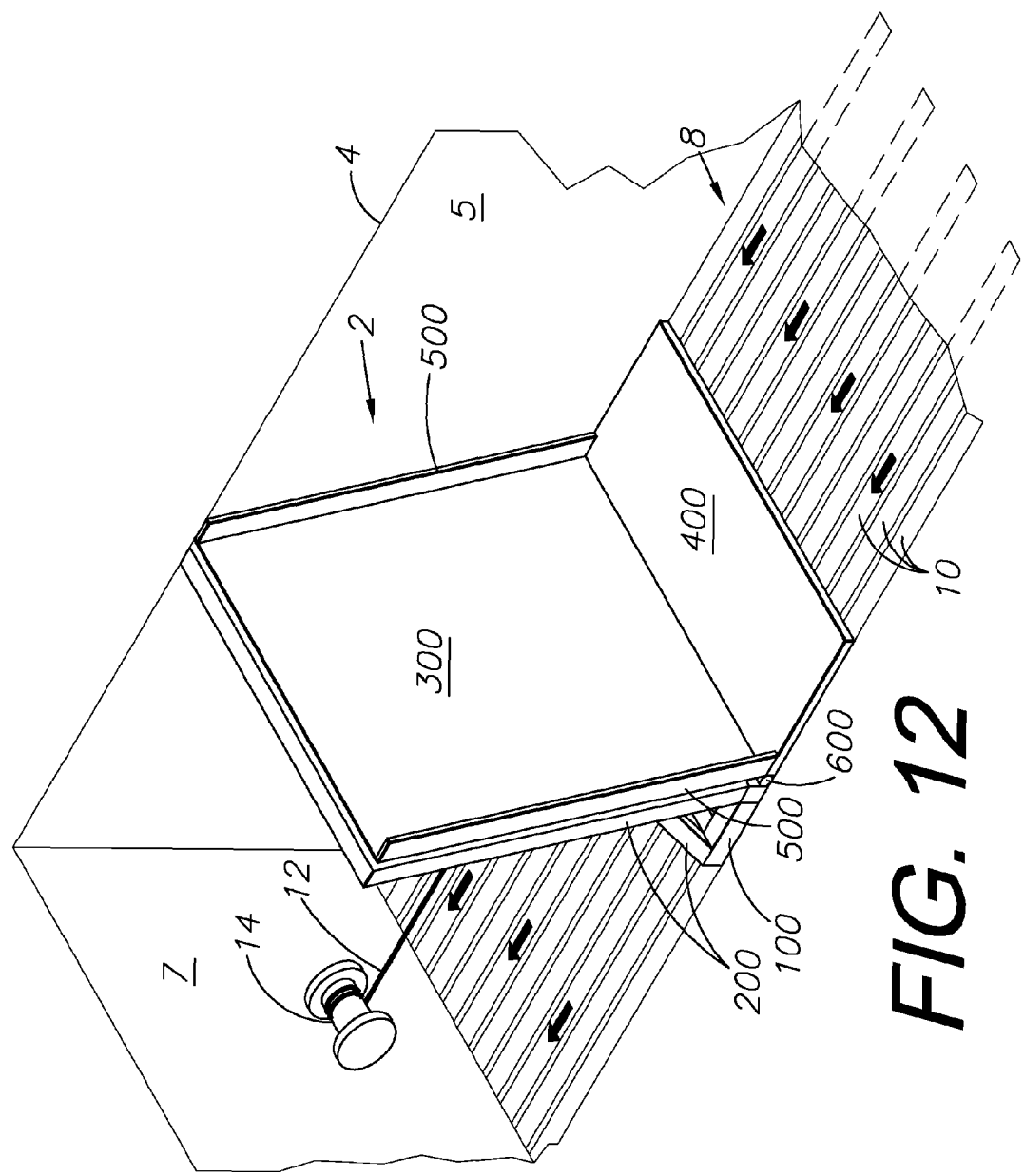
FIG. 12 is a perspective view illustrating an embodiment of the present invention placed on top of a reciprocating slat conveyor at the end of a an unload cycle, wherein a third group of reciprocating slats is retracted.

FIGS. 10-12 represent the retraction of the various slats 10, leaving the ejector system 2 and the loaded material 6 in place for the next unloading step as again shown in FIG. 9, whereby each of the reciprocating slats moves rearward and further advances the ejector system 2 and the loaded material 6. This process continues until the material 6 is completely unloaded from the trailer 4. At this point the ejector system 2 is situated near the open end of the trailer.

Figure 13:
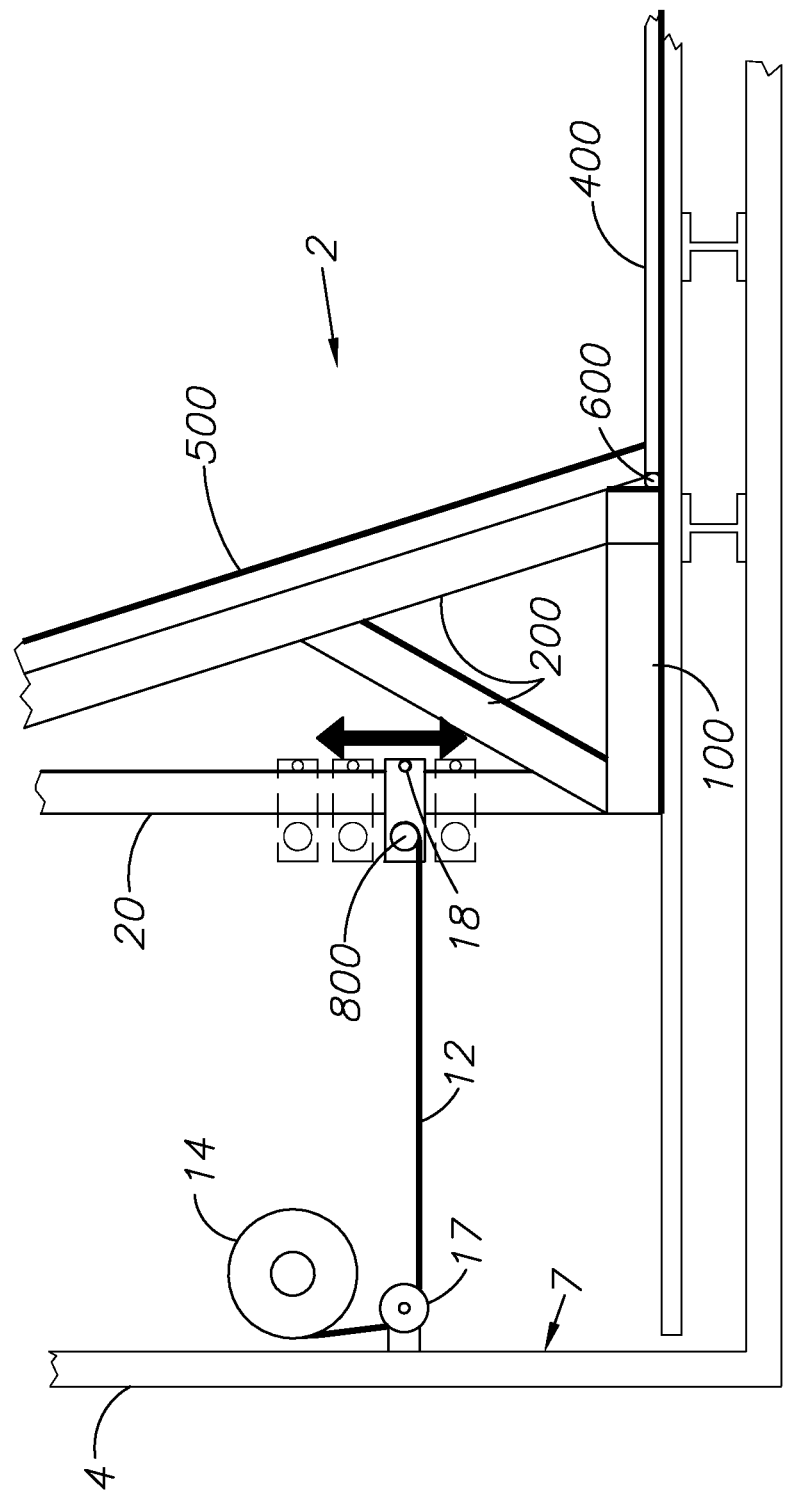
FIG. 13 is a side elevation of an embodiment of the present invention, illustrating a winch mounted to a wall structure of a trailer connected to the invention embodiment via a tether.
Figure 14:
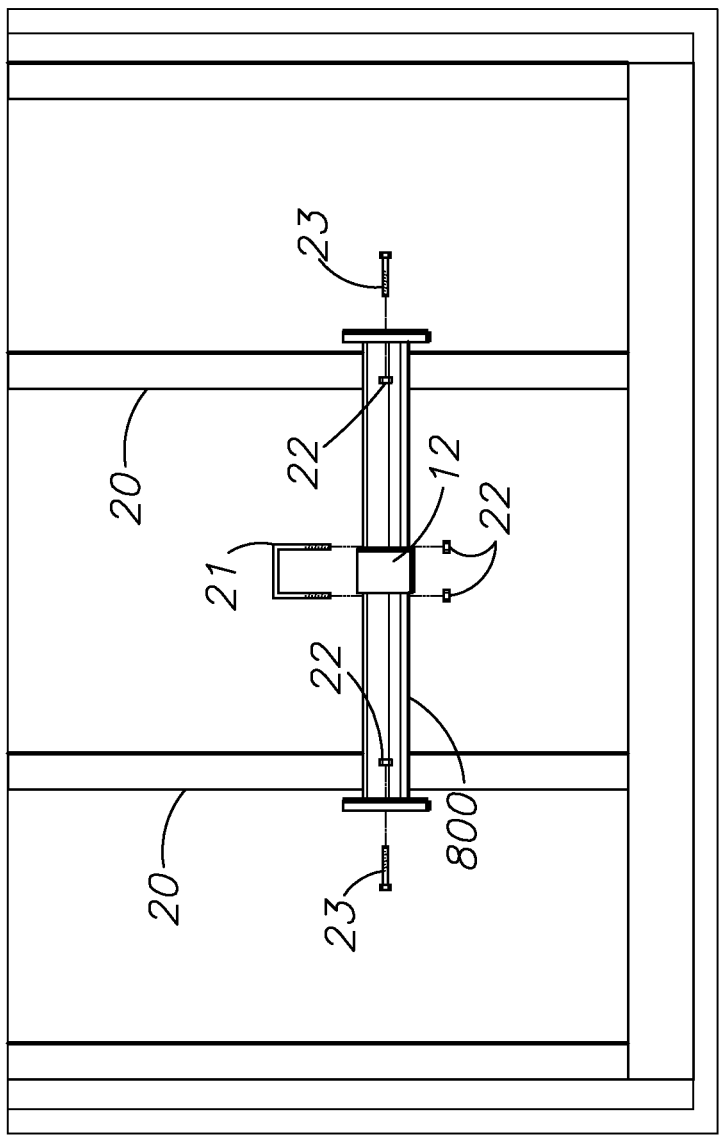
FIG. 14 is a rear elevation of an embodiment of the present invention, illustrating the attachment of a tether bar to the embodiment.

FIGS. 13 and 14 show the tether bar 800, tether 12, and winch 14 elements in more detail. The winch 14 is mounted to the end wall 7 of the trailer 4. An optional pulley 17 may also be mounted to the end wall 7 if desired or necessary. The tether bar 800 is mounted to a pair of upstanding vertical supports 20 connected to the structural supports 200 of the ejector system 2. The tether bar 800 is affixed to the support 20 using a nylon strap 18 on either end, or some other means of temporarily affixing the tether bar to the supports, such as a nut 22 and bolt 23 arrangement shown in FIG. 14. A U-bolt fastener 21 passes through the tether bar 800 to attach the tether 12 securely to the tether bar. Alternatively, the tether bar 800 could be mounted to the existing supports 200.

After a load 6 has been completely emptied from the trailer 4, the winch 14 and tether 12 pull the ejector system 2 back to its starting position at the end wall 7 of the trailer. During this retraction phase, if the ejector system 2 encounters an obstruction or material which has somehow wound up between the ejector 2 and the end wall 7 of the trailer, the ejector system will tip over rearwards (toward the end wall 7 of the trailer). This feature accomplishes three things; (1) it notifies the user that an obstruction is present; (2) it prevents the obstruction from jamming between the ejector 2 and the trailer 4; and (3) it allows the user quick access to remove the obstruction.

If the ejector system 2 tips over and the obstruction is removed, the ejector may be tipped back to its upright position or it may be retracted while laying down. If it is retracting while laying down, the tether 12 will pull the ejector system 2 back to its vertical starting position upon reaching the starting position. A plastic flange may be affixed to the bottom surface of the rectangular base member 100 to reduce friction between the ejector system 2 and the reciprocating slats 10 while the ejector system is being retracted.

As stated previously, this system is suited for bulk flowing materials. These flowing materials tend to stick to the surfaces of trailers during normal unloading processes. The reciprocating floor combined with the ejector system 2 including the floor flange 400 and wall flanges 500 allows the present system to produce a better method for ejecting flowing material from a trailer. The flanges actively remove residual material from the walls and floor while the load is ejected, thereby negating much of the necessity to clean the trailer out between loads. This results in a more efficient unloading process.

III. Alternative Embodiment: Locking Base Flange 402

In an alternative embodiment of a ejector system 52, the user may opt to load a trailer 4 with a load that protrudes above the top of trailer walls 5, thus potentially causing materials to lodge between top of floor & crossbows connecting trailer walls, forcing materials behind the ejector system 52 while it travels underneath the crossbows, such as with a load of tree limbs. In such an instance, the user may fold the flange 402 up against the panel sweeper 300 and lock the flange in place using a locking mechanism 54, such as a pair of tabs.

Figure 15:
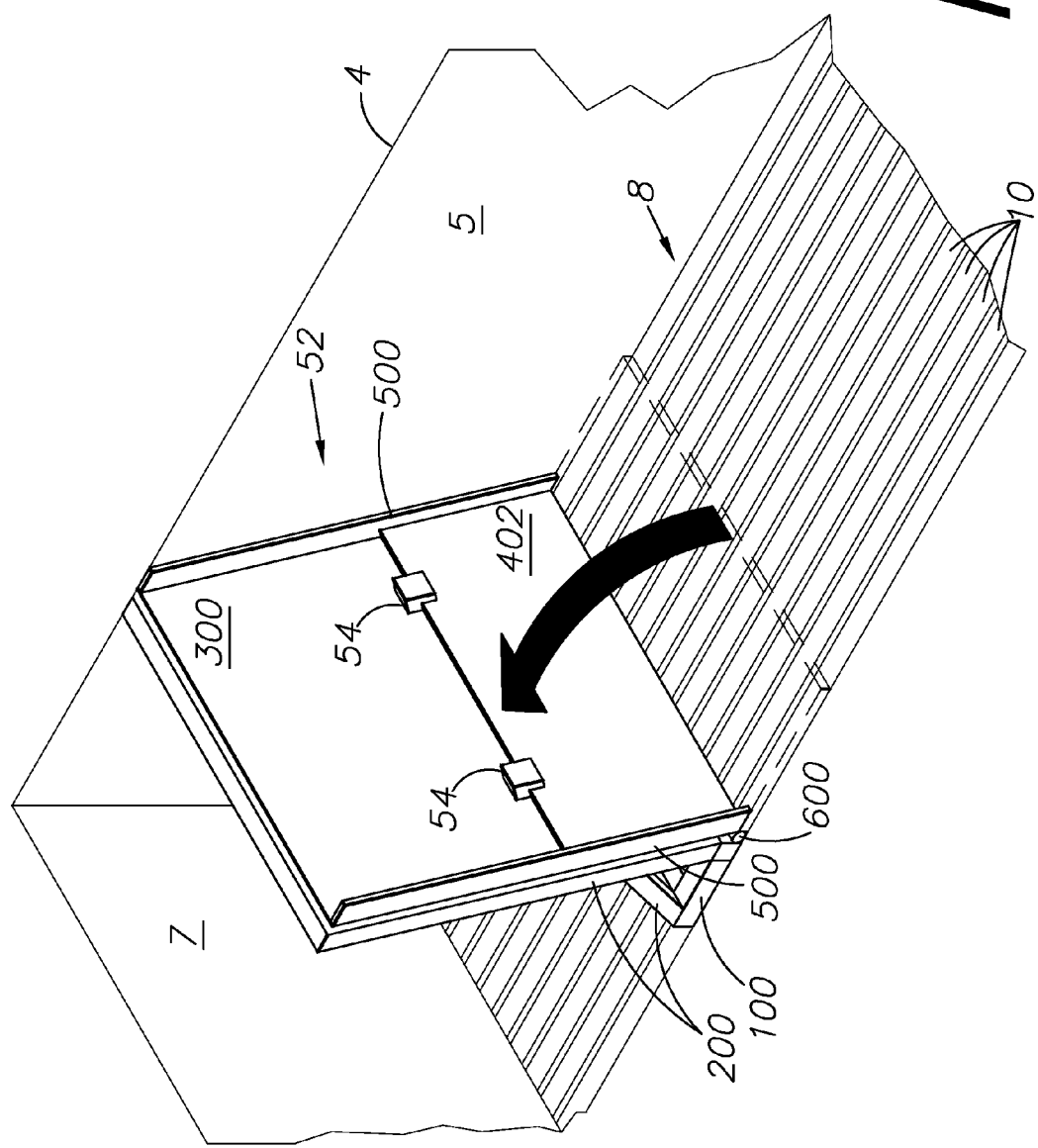
FIG. 15 is a perspective view of an alternative embodiment of the present invention, illustrating the base flange locked against a panel sweeper face.

Because of the flexible nature of the base flange 402, the flange could simply be tucked under a pair of tabs 54, as shown in FIG. 15. The flange 402 may be of any size including having a surface area up to and equal to the surface area of the panel sweeper face 300. Alternatively, the flange could be snapped to the panel sweeper face 300 with some sort of temporary snapping means. Another alternative includes magnetically affixing the flange to the panel sweeper face. It is necessary that the flange 402 remain locked against the face 300 during the entire unloading process of the material which may otherwise jam underneath of the flange. After unloading, the locking means 54 must quickly release the flange 402 for the next load, if it is needed.

An alternative system for lifting and locking the base flange 402 includes a fully adjustable winch and strap system with a hook, wherein the hook engages the base flange 402 to sweeper panel 300 to keep in an upright locked & loaded position. The winch lifts the flange and secures it in place, and is further capable of lowering the flange 402 back into its original position when desired. A number of winches may be used, wherein the straps and hooks are affixed to the flange at various points along the length of its front end.

IV. Alternative Embodiment Side Panel Protectors 104 and/or Ratchet Straps 106 with Hooks 108

Figure 16:
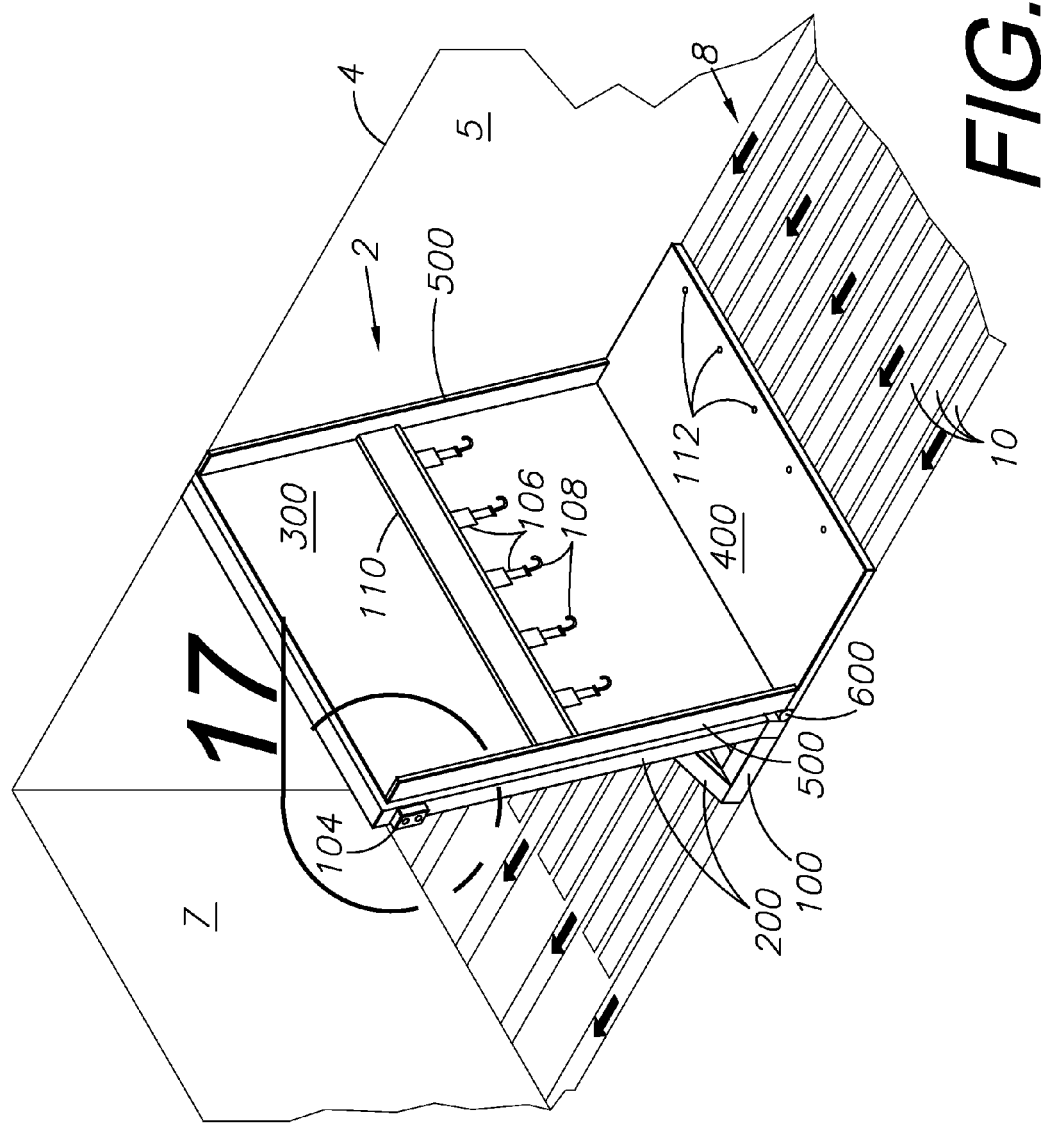
FIG. 16 is a perspective view illustrating an alternative embodiment of the present invention, illustrating a panel sweeper face including ratchet straps.
Figure 17A:
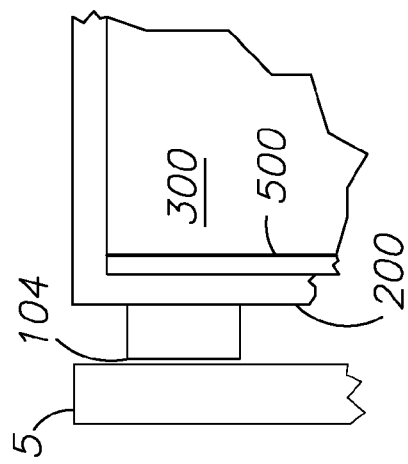
FIG. 17A is a partial elevational view thereof.
Figure 17:
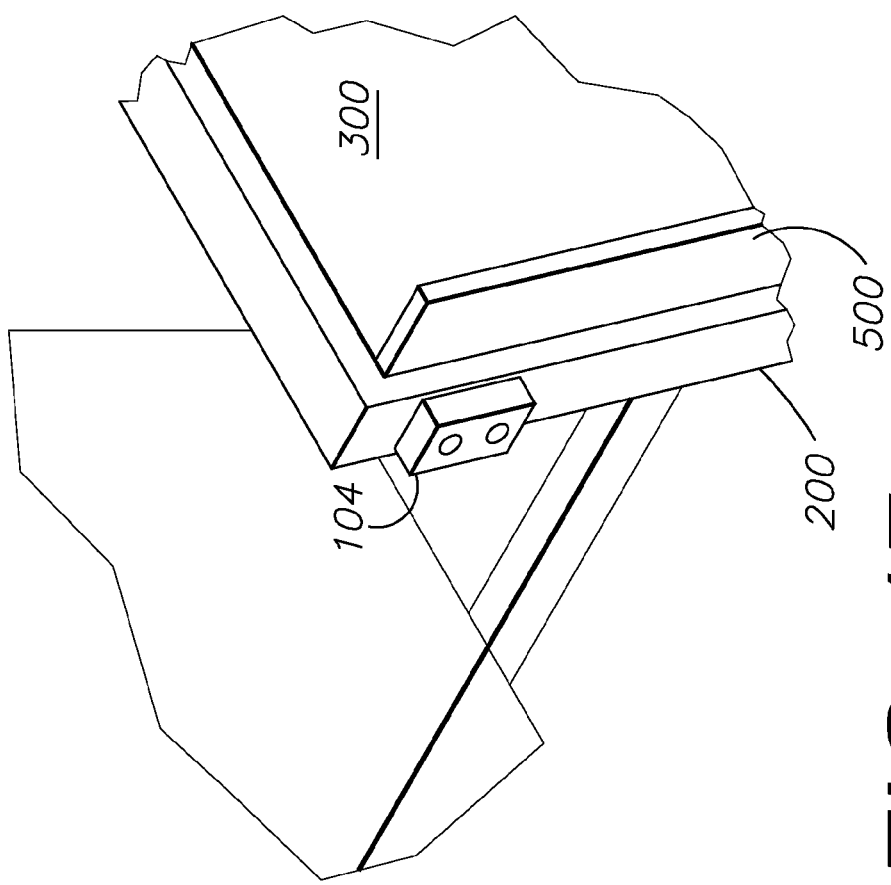
FIG. 17 is a detailed perspective view taken about the circle of FIG. 16.

FIGS. 16, 17, 17A, and 18 show an alternative embodiment of the above invention including side panel protectors 104. These panel protectors are ideally manufactured from ultra-high molecular weight (UHMW) plastic, or a similar composite, for low-friction and high-resilience. The purpose of the protectors 104 is to prevent the trailer walls from coming into contact with the headboard, coupled with unloading the trailer on un-even terrain, which tends to cause over-rotation of the ejector system 2 within the confines of the trailer 4 as the system operates. Most trailers are designed to flex (also referred to as "racking"). While doing so, the protectors 104 keep forceful engagement with the headboard, thus preventing damage to the outer walls. The panel may tend to tilt perpendicular to the forward and backward movement of the ejector system, which could cause the structural elements 100, 200, 500 of the sweeper to come into contact with the side walls 5 or roof of the trailer 4, damaging one or both pieces of equipment. The protectors 104 ensure that the panel cannot rotate further than a few degrees, as shown by FIG. 17A, and are manufactured from suitable materials to prevent the panel from buckling or pivoting when contact with the walls does occur.

Figure 18:
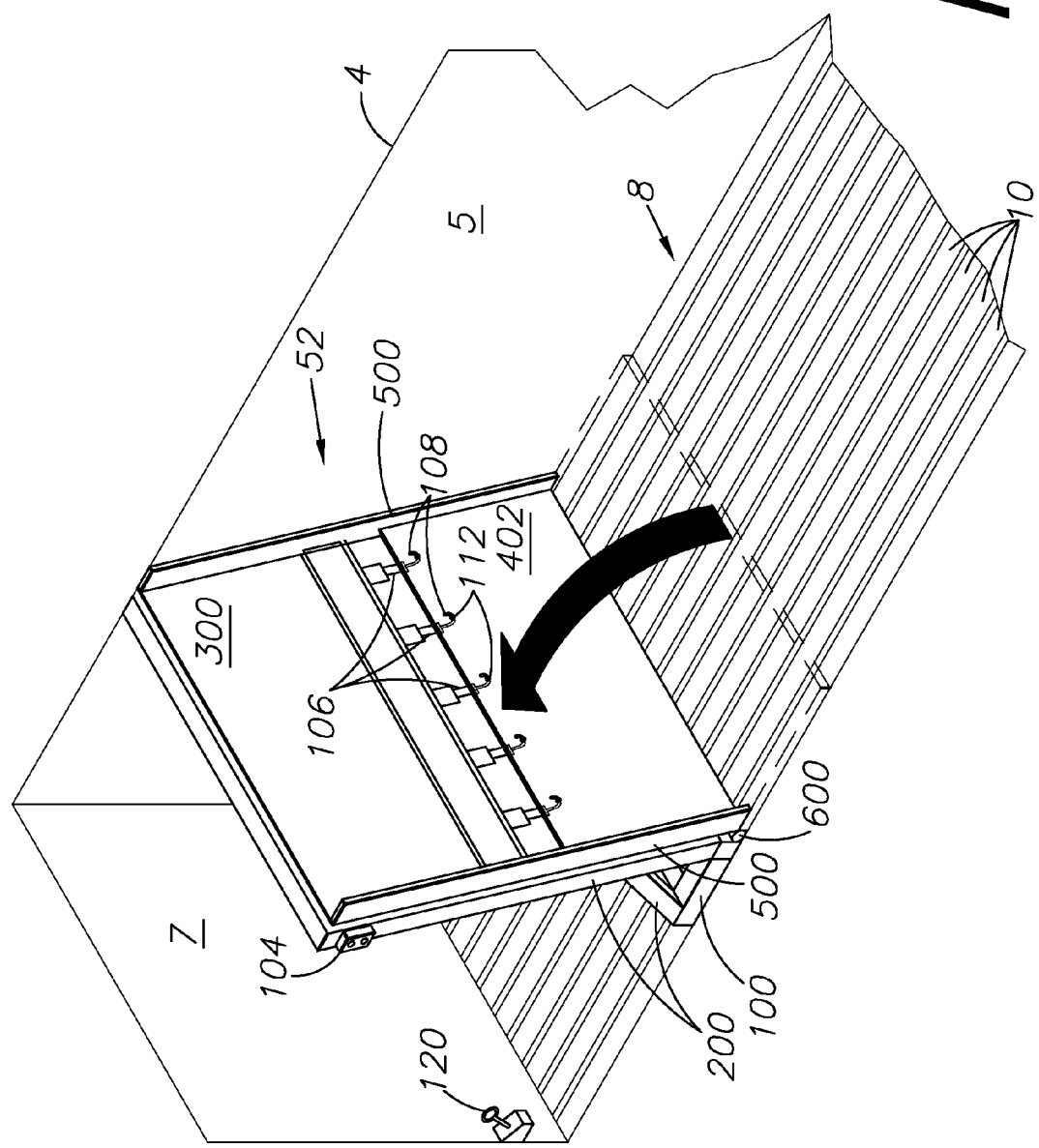
FIG. 18 is a perspective view thereof, showing the base flange locked against a panel sweeper face with ratchet straps.

FIGS. 16 and 18 also feature hooks 108 suspended from ratchet straps 106 which may connect with receivers 112 of the base flange 400, similar to the concept shown in FIG. 15. However, the previous embodiment disclosed in FIG. 15 tends to allow the flexible base flange 400 to sag in the middle, which could cause material to be caught between the sagging flange 400 and the face 300 of the sweeper panel. The ratchet straps 106 are connected to a rigid beam 110 or other structural element and allow the straps to be pulled tight, thereby removing the flexing of the base flange 400 and preventing material from being forced between the flange and the sweeper panel face 300. The receivers 112 may simply be holes within the base flange, or they may be protected holes, such as metal rings passing through the flange, or they may be other structural elements affixed to the top face of the flange 400. Otherwise, once the flange 400 is pulled tight against the face 300 of the sweeper, the system functions similarly to the embodiment disclosed above and in FIG. 15.

V. Alternative Embodiment Releasable Restraining Chain 124 and Hook 122

Figure 19:
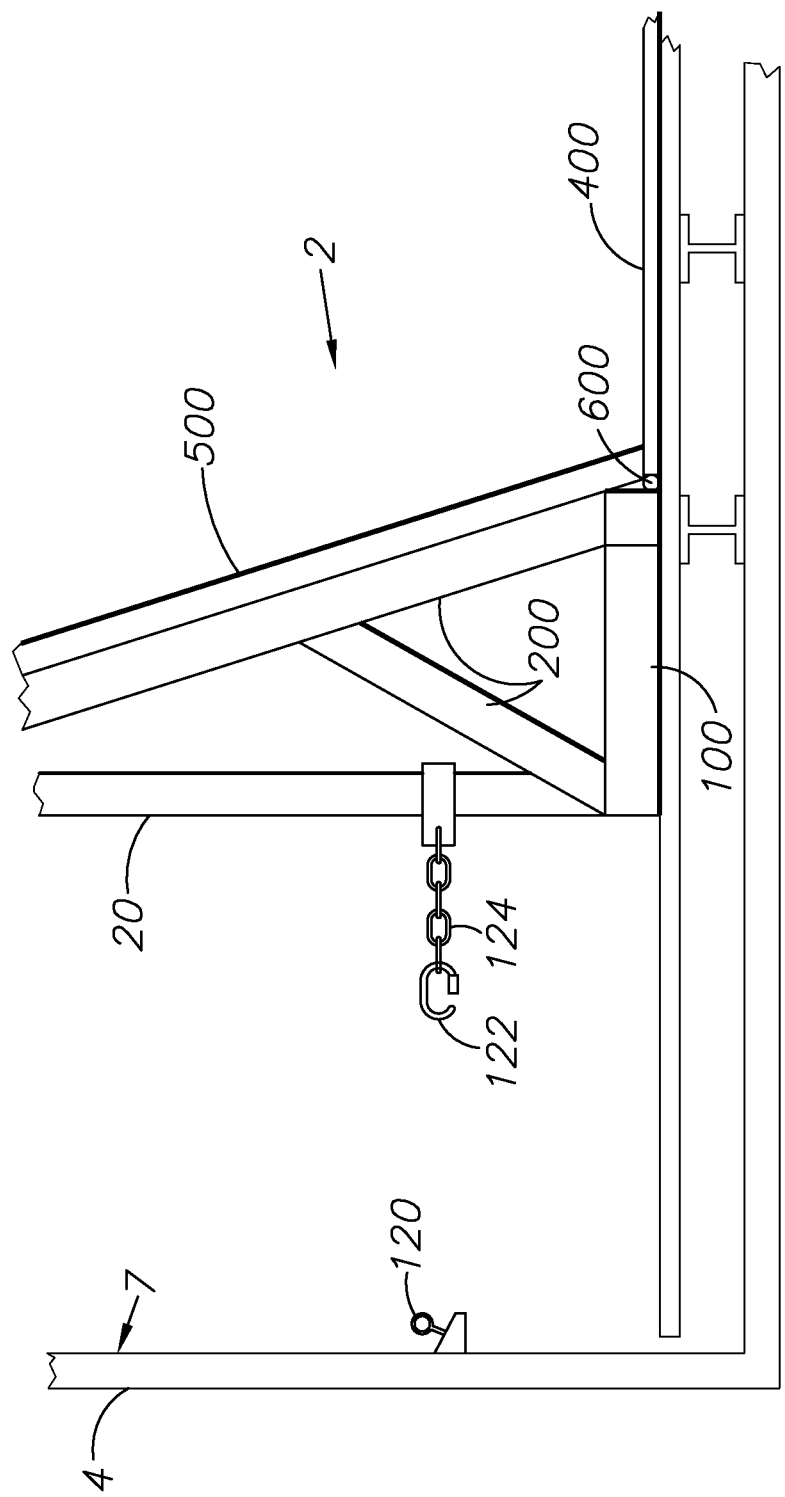
FIG. 19 is a side elevational view of an alternative embodiment of the present invention showing a releasable restraining chain.

FIG. 19 features an alternative embodiment of the ejector system 2 which includes a restraining chain 124 affixed to the structural support of the ejector, such as the vertical supports 20. The chain terminates in a releasable hook 122, such as a carbineer, a hook with a hinged safety latch, or a hook with a threaded safety latch. The hook 122 can connect to a receiver 120, such as an eyehook, connected to the front wall 7 of the trailer 4. This prevents the ejector system 2 from moving away from the front wall 7 when unloading the trailer or when on a tipping platform or hauling other debris (e.g. tree limbs) which may protrude over the top of the side walls of the trailer. It also prevents the ejector system 2 from tipping or moving while the trailer 4 is in transport or if there are high winds.

VI. Alternative Embodiment with Extension 302

Figure 20:
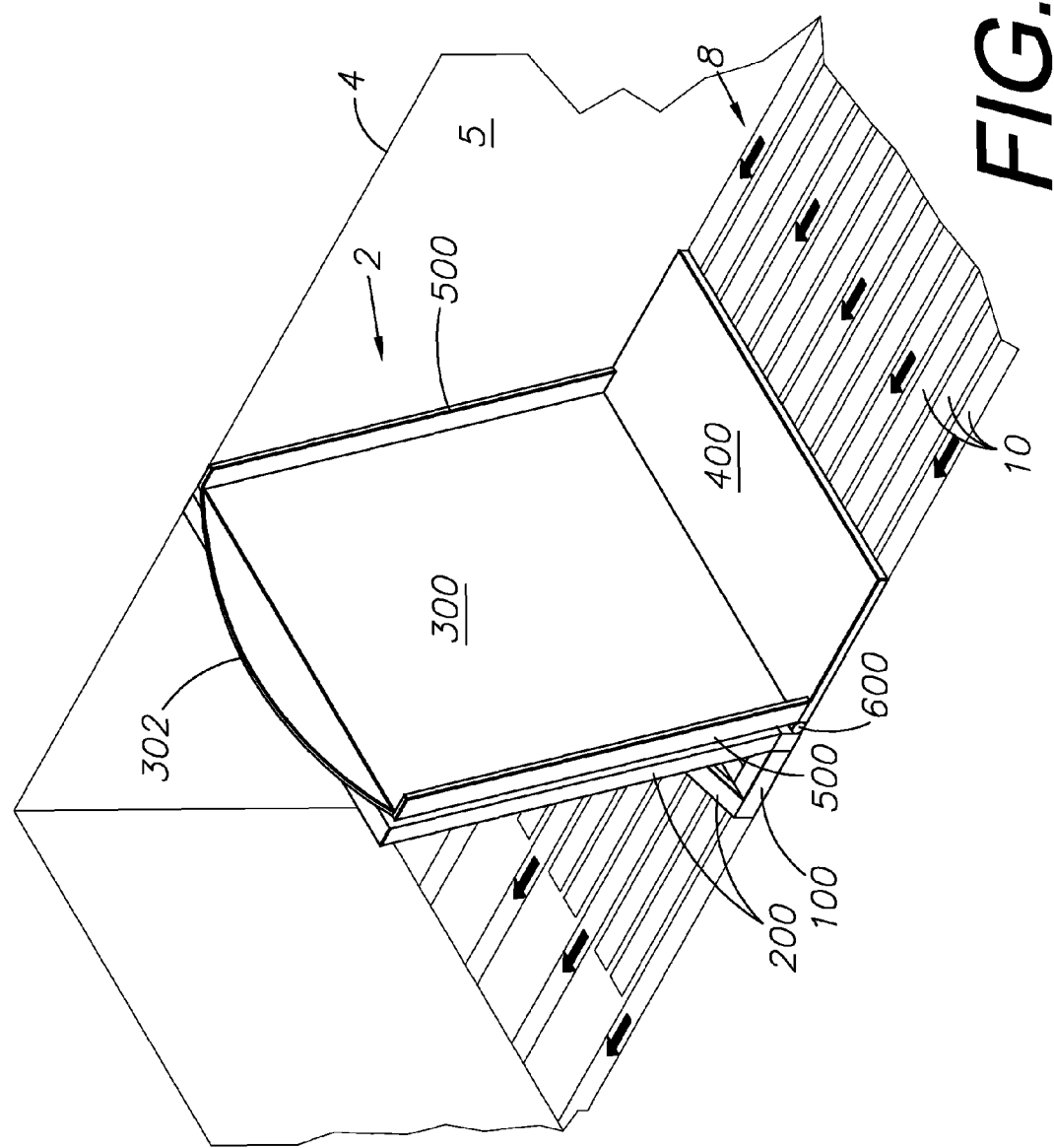
FIG. 20 is a perspective view of an alternative embodiment of the present invention including an extension panel above the panel sweeper face.
Figure 21:
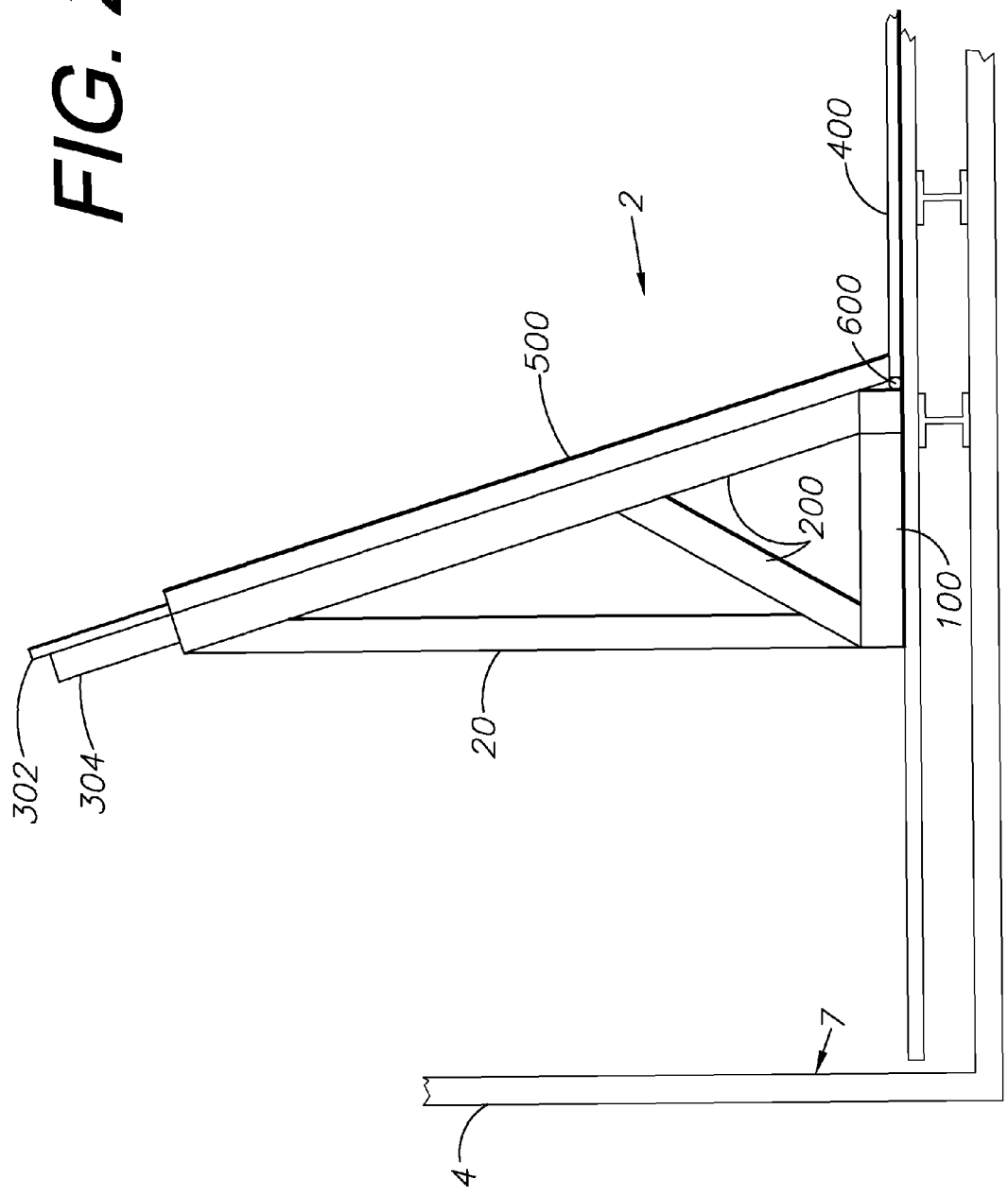
FIG. 21 is a side elevational view thereof.

FIGS. 20 and 21 show an alternative embodiment ejector system 2 having an extension 302 placed above the sweeper panel face 300 to increase the capacity of the ejector system 2, allowing the system to move more material loaded into the trailer 4. As shown, the extension extends above the original sweeper panel face 300. The extension may be any shape, but is shown having a slight arc to correspond with an amount of material as it would typically appear within a trailer. Supports 304 hold the extension 302 up, and may be bolted or otherwise temporarily or permanently affixed to the supports of the original ejector system 2.

Alternatively, the extension 302 may be connected directly to the sweeper panel face 300, such as via screws or other fasteners. This essentially places the extension against the sweeper panel face 300, but the extension 302 will extend above where the original face 300 extended.

VII. Alternative Embodiment with Locking Panels 356

Figure 22:
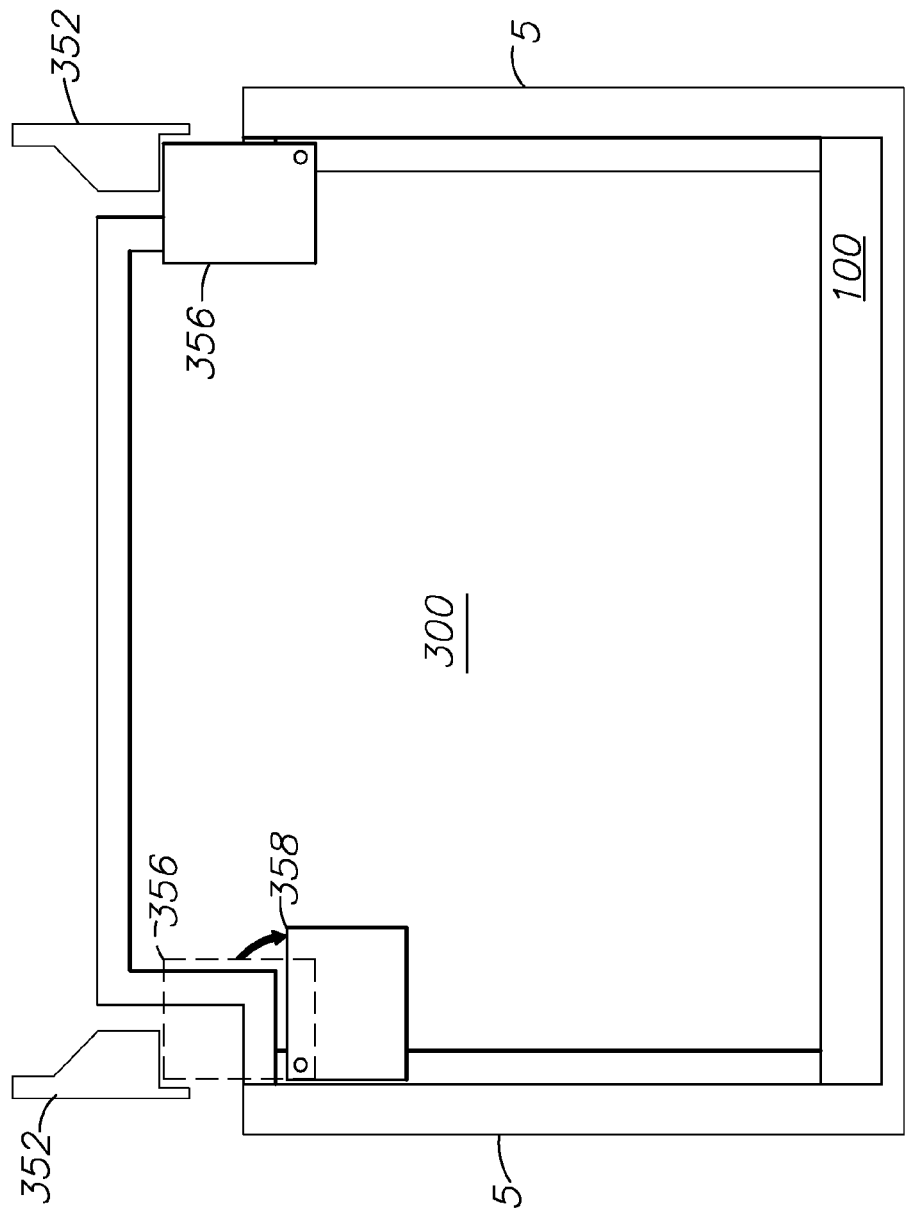
FIG. 22 is a rear elevational view of an alternative embodiment of the present invention including locking plates.

FIGS. 22-23C disclose an alternative embodiment ejector system including locking panels 356 as distinguishable from the previously disclosed ejector system 2 without locking panels. FIGS. 22 and 23C disclose the alternative embodiment, whereas FIGS. 23A and 23B disclose the previous embodiment and prior art.

In FIG. 22 the locking panels 356 are shown as rectangular plates pivoting about a pivot point, such as a bolt. These panels lock in a vertical orientation such that they are in proximity with the headboards 352 of the trailer 4 side walls. When the panels are in an unlocked orientation 358, the entire ejector system can be tilted forward to clean material from behind the panel; however, when locked in the locked position as indicated by 356, the panel cannot tilt past the headboards 352, as shown in FIG. 23C. The locking panels either directly come into contact with the headboards 352 or they come into contact with a stopping element affixed to those beams (not shown).

FIGS. 23A and 23B show what happens if the ejector system is allowed to tilt freely. Sometimes high winds can cause the ejector system 2 to tilt forward, as shown in FIG. 23B, without the operator desiring that motion to occur. This can damage equipment or cause potential injuries to the operator. However, the ability for the entire ejector system 2 to tilt forward for cleaning purposes is desirable, so the alternative embodiment shown in FIGS. 22 and 23C is preferred.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. An ejector system for a trailer including two side walls, a floor structure, a front end, a rear end and an interior space formed by said sidewalls and said floor structure, said interior space being adapted to receive contents for ejecting from said trailer, which ejector system includes:
   said floor structure including a reciprocating floor system adapted for advancing contents of said interior space towards said trailer rear end;
   an ejector including a structural frame, a sweeper panel, a pair of side flanges and a base flange adapted for engaging said trailer and said interior space;
   said ejector being movable between front and rear positions by said reciprocating floor;
   said ejector flange being adapted for removing contents from said interior space as said ejector moves from its front position to its rear position;
   said side flanges and said base flange comprised of a flexible material;
   said side flanges forming a seal between said sweeper panel side edges and said trailer side walls;
   said base flange configured to travel with said ejector from said front to said rear positions in a first, generally horizontal transport position wherein said material is at least partially located on top of said base flange;
   said base flange configured to flex downward into a second, unloading position upon reaching the rear end of said trailer, such that material is caused to slide off of said flange adjacent to said rear end of said trailer;
   a plurality of ratchet straps each having a first end affixed to said sweeper panel and each having a second end terminating in a hook;
   said base flange including a respective plurality of receiver holes each corresponding to one of said plurality of ratchet straps hooks; and
   said plurality of ratchet straps configured to selectively draw said base flange flush with said sweeper panel.

2. The ejector system of claim 1, wherein:
   said sweeper panel width conforms to the width of the interior space of said trailer as defined by said two side walls; and
   said sweeper panel height conforms to the height of the interior space of said trailer.

3. The ejector system of claim 1, further comprising:
   a locking mechanism affixed to said sweeper panel; and
   said locking mechanism adapted for restraining said base flange flush against the front face of said sweeper panel.

4. The ejector system of claim 1, further comprising a low-friction plate affixed to said structural frame, said plate adapted to provide low-friction contact between said ejector and said reciprocating floor.

5. The ejector system of claim 1, further comprising:
   an opening in said sweeper panel adapted for providing access to the area of the trailer positioned behind said sweeper panel; and
   a door affixed to said sweeper panel, said door capable of selectively blocking said opening.

6. The ejector system of claim 1, further comprising:
   an adjustable tether bar affixed to said structural frame of said ejector;
   a winch affixed to the front end of said trailer; and
   a tether connecting said tether bar to said winch, whereby said winch is capable of pulling the ejector to a starting position located in proximity to said trailer front end.

7. The ejector system of claim 6, wherein said ejector will tip backwards toward the front end of said trailer if said ejector comes into contact with an obstruction while said winch is actively pulling said ejector.

8. The ejector system of claim 1, further comprising:
a restraining chain affixed to the front end of said trailer, said restraining chain terminating in a releasable hook;
a receiver affixed to said ejector structural frame; and
said restraining chain configured to restrain said ejector in proximity to said front end of said trailer.

9. The ejector system of claim 1, further comprising:
an extension configured to be placed above said sweeper panel, said removable extension comprising a front face configured to be generally along the same plane as said sweeper panel and supports configured to hold said extension panel in place; and
said extension extending above the two side walls of said trailer.

10. The ejector system of claim 9, wherein said extension is selectively removable.

11. The ejector system of claim 9, wherein said ejector panel comprises a top edge having a generally arcuate shape.

12. The ejector system of claim 1, further comprising:
a pair of locking panels, each locking panel pivotally mounted to a respective headboard of said two side walls of said trailer;
said pair of locking panels configured to be rotated between a first, locked position and a second, unlocked position;
wherein said locking panels are configured to restrict said ejector from tipping within said trailer when said locking panels are in said first, locking position; and
wherein said ejector is free to tip over when said locking panels are in said second, unlocked position.

* * * * *